United States Patent [19]
Bassett et al.

[11] Patent Number: 5,498,954
[45] Date of Patent: Mar. 12, 1996

[54] CONTROL SYSTEM AND METHOD FOR THE PARALLEL OPERATION OF VOLTAGE REGULATORS

[75] Inventors: David L. Bassett, Macungie; Dan E. Weatherly, Whitehall, both of Pa.

[73] Assignee: Pennsylvania Power & Light Company, Allentown, Pa.

[21] Appl. No.: 301,477

[22] Filed: Sep. 7, 1994

Related U.S. Application Data

[63] Continuation of Ser. No. 866,899, Apr. 1, 1992, abandoned.

[51] Int. Cl.⁶ ..................................................... G05F 1/14
[52] U.S. Cl. ............................................ 323/340; 323/255
[58] Field of Search ................................... 323/255, 256, 323/257, 263, 340, 343; 307/31, 17; 364/493

[56] References Cited

U.S. PATENT DOCUMENTS

| | | | |
|---|---|---|---|
| 4,264,960 | 4/1981 | Gurr | 364/492 |
| 4,320,306 | 3/1982 | Kohga et al. | 307/51 |
| 4,363,974 | 12/1982 | Beckwith | 307/40 |
| 4,384,247 | 5/1983 | Steward | 323/256 |
| 4,419,619 | 12/1983 | Jindrick et al. | 323/257 |
| 4,612,617 | 9/1986 | Laplace, Jr. et al. | 364/483 |
| 4,630,220 | 12/1986 | Peckinpaugh | 364/492 |
| 4,686,630 | 8/1987 | Marsland | 364/492 |
| 4,695,737 | 9/1987 | Rabon et al. | 307/31 |
| 4,769,751 | 9/1988 | Schraudolph et al. | 363/35 |
| 4,780,660 | 10/1988 | Shima et al. | 323/207 |
| 4,819,180 | 4/1989 | Hedmun et al. | 364/492 |
| 4,845,594 | 7/1989 | Wilkerson | 361/71 |
| 4,868,410 | 9/1989 | Nakamura | 307/20 |
| 4,916,377 | 4/1990 | Terada et al. | 323/210 |
| 4,979,122 | 12/1990 | Davis et al. | 364/483 |
| 5,055,766 | 10/1991 | McDermott et al. | 323/255 |
| 5,117,175 | 5/1992 | Pettigrew et al. | 323/256 |
| 5,136,233 | 8/1992 | Klinkenberg et al. | 323/343 |

FOREIGN PATENT DOCUMENTS

| | | |
|---|---|---|
| 58-62712 | 4/1983 | Japan . |
| 0092912 | 4/1991 | Japan . |
| 447-793 | 8/1972 | U.S.S.R. . |
| 760-210 | 8/1980 | U.S.S.R. . |
| 1415322 | 9/1986 | U.S.S.R. . |
| 1427479 | 9/1988 | U.S.S.R. . |
| 1492417 | 7/1989 | U.S.S.R. . |
| 1520625 | 11/1989 | U.S.S.R. . |
| 1534625 | 1/1990 | U.S.S.R. . |

OTHER PUBLICATIONS

Lilley et al "Automatic Tup Change Control System for Supergred Transformers" IEE Trans. power Disribution and Apparatus, Winter 1986.
Christensen et al "New Controls Optimize Old Cogeneration System" Plant Engineering (Feb. 4 1988).
Bashford et al, "Micro. in Subs. Control", IEE Trans . . . Apparatus, Winter 1991.
Hawkins et al, "On–line Algorithms . . . assessment," IEEE Trans on Pwr Dest and App., Winter, 1991.
Capraneto et al., "a Best–first . . . control", IEE Trans. on Pwr. Dest. & apparatus, Winter 1991.

(List continued on next page.)

Primary Examiner—Peter S. Wong
Assistant Examiner—Adolf Berhane
Attorney, Agent, or Firm—Ratner & Prestia

[57] ABSTRACT

The invention is a system and method for changing the tap position of transformers, where two or more of the transformers are operating in parallel, based on the measured low side bus voltage and low side MVAR flow. A programmable logic controller (PLC) calculates the average low side bus voltage for the transformers operating in parallel. The PLC also calculates a feedback voltage for each transformer as a function of circulating MVAR flow for each transformer operating in parallel based on concept of preventing the tap position of a transformer from exceeding a certain relative difference compared to other transformers.

32 Claims, 9 Drawing Sheets

Microfiche Appendix Included
(3 Microfiche, 84 Pages)

OTHER PUBLICATIONS

Karam et al., "A Programmable . . . Logic", Can. Elet. Assoc., Montreal Mar. 1988.

Barakat et al "Applications of Micro Comp . . . Problems" IEEE Trans. on Pwr. Dist. & Apparatus Winter, 1991.

Adams et al "Integrated . . . Communications" IEE Trans. on Pwr. Dist & App. Winter 1991.

Lai et al "Integr . . . Protection", IEE Trans. of Pwr. Dist.and Apparatus Winter, 1991.

Rubicam "Inplant Voltage Reg. . . . and Solutions—part I—The best of Plant Eng.—1986" Plant Eng., Dec. 24, 1986.

Klinkenberg, "Computerized Power Transformer Voltage Regulating System," EBI Transmission & Distribution Committee Meeting, Tulsa, Okl May 1992.

S. Grosu, "On–load tap changing for distribution transformers", *Proc. IEEE,* vol. 119, No. 4, pp. 467–471 (Apr. 1972).

A. G. Hoffman et al., "Energy Management System For An Industrial Plant", IAS Annual Meeting, pp. 22–30 (1977).

J. Sandell et al., "Microprocessors in Substation Control", Conference on Microprocessor Systems, pp. 37–41 (Nov. 1977).

CONTROL SYSTEM AND METHOD FOR THE PARALLEL OPERATION OF VOLTAGE REGULATORS

This application is a continuation of application Ser. No. 07/866,899 filed Apr. 1, 1992 now abandoned.

A microfiche Appendix is included in this application containing 3 microfiche. Microfiche Number 1 contains 83 frames plus one test target frame for a total of 84 frames. Microfiche Number 2 contains 83 frames plus one test target frame for a total of 84 frames. Microfiche Number 3 contains 32 frames plus one test target frame for a total of 33 frames.

A portion of this patent document contains material which is subject to copyright protection. The owner has no objection to the facsimile reproduction by anyone of the patent document or patent disclosure as it appears in the Patent and Trademark Office patent file or records, but otherwise reserves all rights whatsoever.

TECHNICAL FIELD

The invention relates to the field of voltage regulation, and in particular, to the automatic control of voltage regulators operated in parallel.

BACKGROUND OF THE INVENTION

In a typical power system, a distribution substation receives power at a high voltage (e.g., 230 kV), and the power is transformed onto separate three-phase distribution lines at a lower voltage. The distribution lines carry the power to consumer locations, where local transformers provide service at 120 volts (or other NEMA standard voltages) to customers.

In order to meet regulatory requirements and to avoid impaired service to customers, the transformer output voltage is tightly controlled. To change a transformer's output to respond to varying customer demand, the most common method is to increase or decrease the number of active turns in one of the transformer's windings with respect to another winding (turns ratio). The process of changing the turns ratio is referred to as a tap change, and is effective to change the voltage ratio of the transformer. To maintain service continuity, the tap changes are carried out while the transformer is under load. A large variety of control systems have been developed to automate the process of tap changes under load.

In the power distribution substation, it is common to employ multiple three-phase transformers, operating in parallel. If the transformers have different turn ratios, reactive power (VARs) will circulate from the transformer with the highest open circuit output voltage to the others. As the difference between the tapping positions of the transformers increases, so does the magnitude of the circulating VARs. It is therefore desirable to employ control methods for the transformers' tap positions which consider all of the parallel transformers.

Several methods have been devised to control tap changing under load, both for systems having a single transformer, and for parallel systems. U.S. Pat. No. 4,695,737 to Rabon, et al discusses a load compensating power distribution regulator system for AC power distribution. The system includes multiple regulators and has sensors for measuring the regulator voltage and output current under computer control. The actual circuit voltage and change in output current are determined based on the measured data. Voltage regulator changes are limited to maintain the actual circuit voltage within a desired range.

The methods disclosed in the prior art rely on the transformer low voltage side bus voltage and the transformer current to determine the best tap position, when implementing a change. This method works well as long as the high side and low side of the transformers are connected. If the high side is split, as may occur during breaker maintenance, the tap changer control system may lockout (i.e., no tap changes will be permitted) if an excessive circulating current is detected.

Additional difficulties have been encountered in prior art systems which measured the circulating current between transformers. These systems tend to respond to both real power and reactive power flows, and may experience errors when the circulating real power is high.

SUMMARY OF THE INVENTION

This invention is a system and method for controlling voltage regulators operating in parallel by determining the output voltage and the reactive power of each regulator, using the determined output voltage and reactive power to determine whether each regulator is operating within an allowable error voltage bandwidth, and actuating each voltage regulator which is operating outside the allowable error voltage bandwidth to change its output voltage in a direction towards the allowable error voltage bandwidth.

DETAILED DESCRIPTION OF THE INVENTION

OVERVIEW

Figure 1:
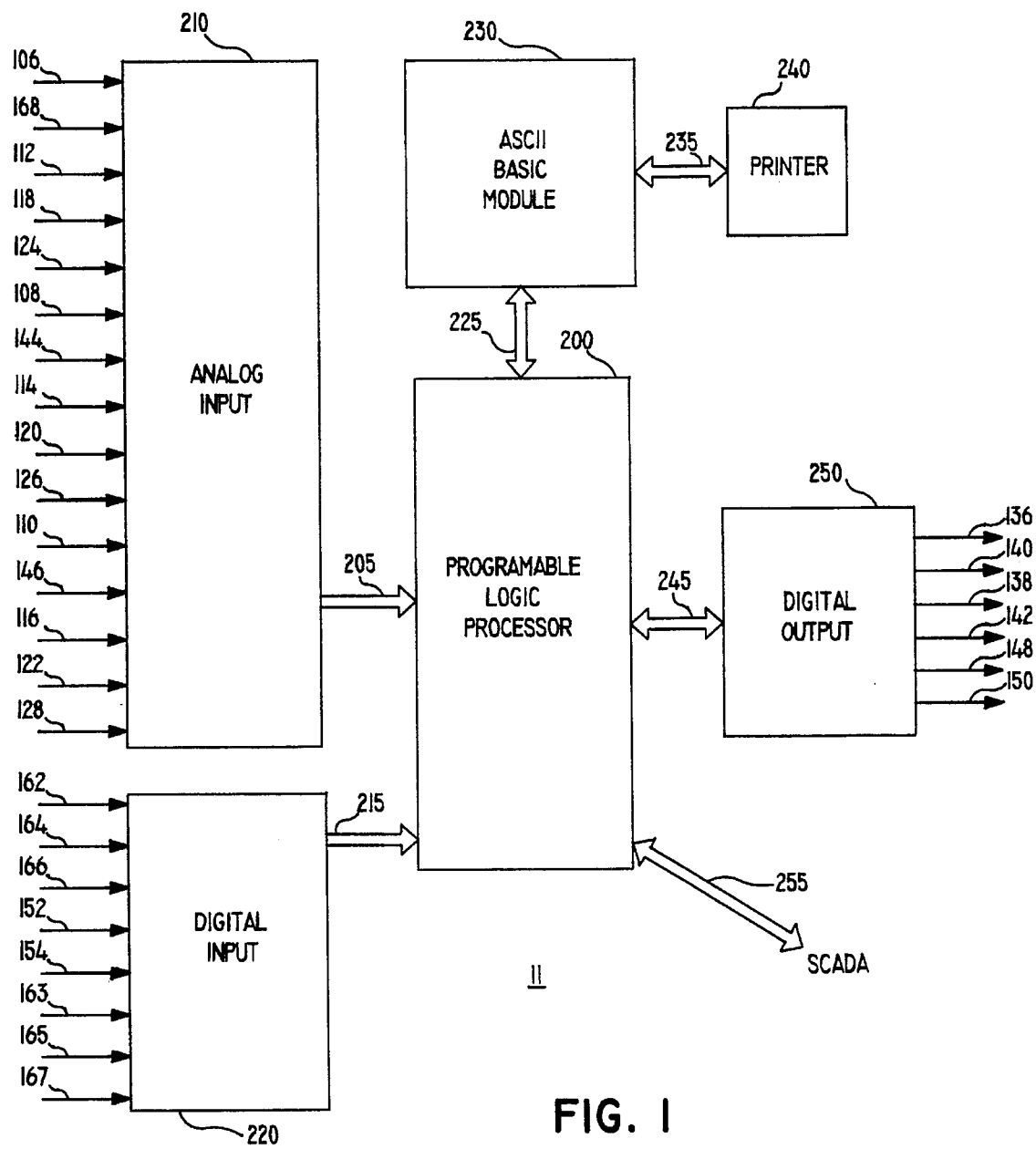
FIG. 1 is diagram of the programmable logic controller 11.
Figure 2:
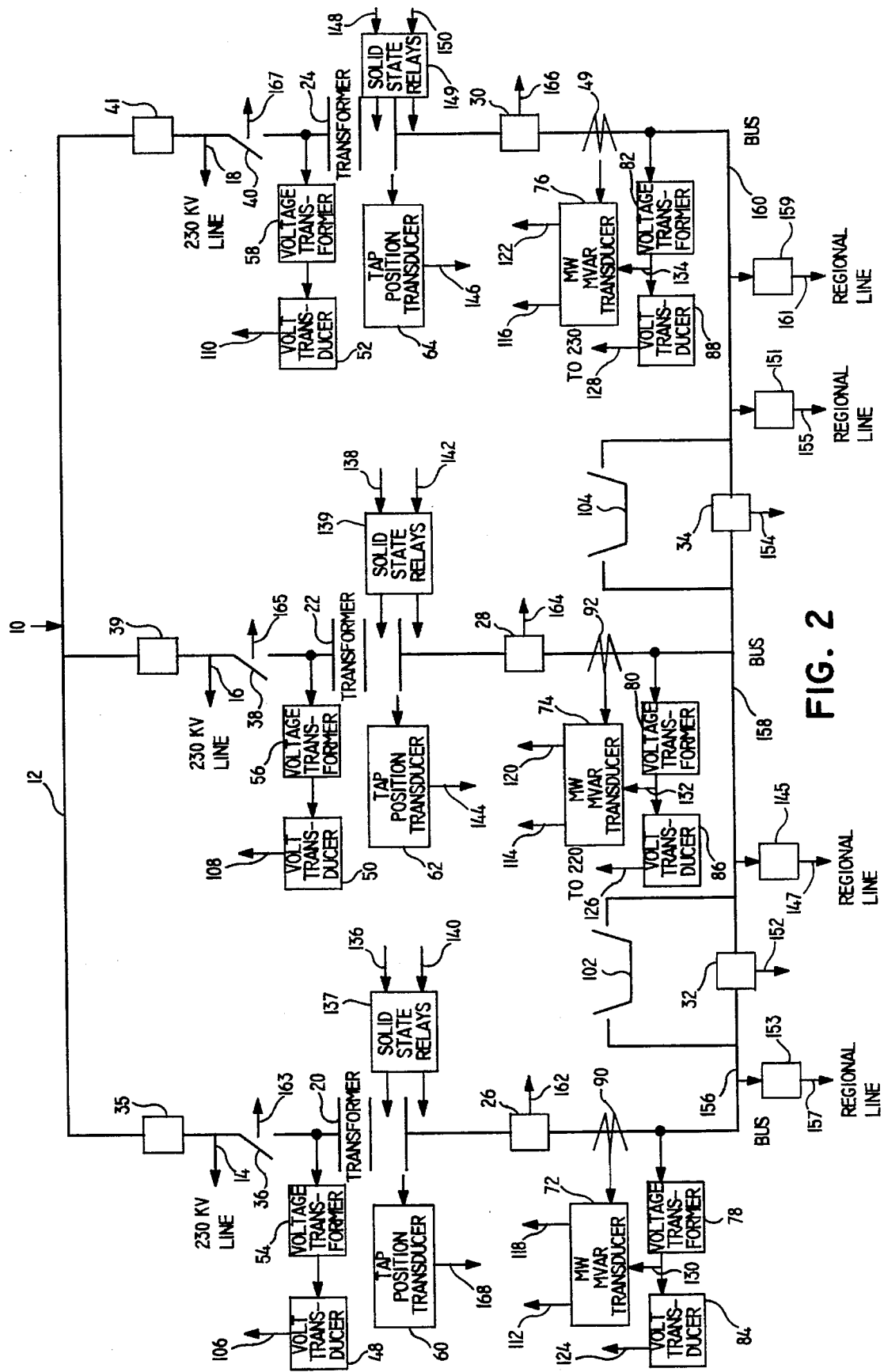
FIG. 2 is a diagram of an exemplary substation configuration used in the preferred embodiment of this invention.

The programmable logic controller 11 as shown in FIG. 1 is the exemplary embodiment of a controller which is used to change the tap positions of the transformers 20, 22, and 24 as shown in FIG. 2, based on the measured value of the low side bus voltage 124, 126, and 128 and the low side MVAR 118, 120, and 122 for each transformer 20, 22, and 24, respectively.

A total error voltage for each transformer is determined and a change in tap position is requested (provided other conditions are met) when the total error voltage is outside a predetermined error voltage bandwidth. The total error voltage for each transformer operating in parallel is equal to the average low side bus voltage of the transformers operating in parallel less the desired voltage less a feedback voltage (which is a function of the normalized circulating MVARs in the transformer) less the line drop compensation (if any) less any biases (if included, they are used to offset the desired voltage) less a skew constant (which varies for each transformer).

The allowable error voltage bandwidth of the control system is generally set to about the step size of the transformer times the rated (low side) output voltage of the transformer multiplied by 150%. The control system only allows a change in the tap position of a transformer when the total error voltage is out of the allowable error voltage bandwidth, for example, greater than seventy-five percent of the increase or decrease of the output voltage of the transformer due to a single step change in tap position. A change of one tap position cannot result in overshooting the deadband or cause the tap changers to "hunt".

The feedback voltage for each transformer is determined by multiplying the normalized circulating MVAR for the transformer level by a tap change correction constant, K4. The tap change correction constant, K4 is set so that when any transformer is two or more tap positions apart from the other(s), the normalized MVAR flow levels that occur multiplied by the constant K4 will yield feedback voltage levels that will cause at least one transformer to be out of the allowable error voltage bandwidth and change to a tap position more nearly equal to the other(s). The normalized circulating MVARs are determined based on the Mega Voltampere (MVA) rating and impedance for each transformer and the low side MVAR power level for each transformer.

The line drop compensation can be used in the determination of the error voltage to account for the voltage drop caused by the MVARs flowing from substation 10 shown in FIG. 2. This allows the voltage at a point other than the low side bus 156, 158, and 160 to be regulated. Use of the line drop compensation can also be used to allow two electrically close substations to regulate independently without interference.

The skew constants used in the determination of the error voltage are used to prevent changing the tap position of more than one transformer at the same time when unnecessary. Due to the accuracy of the equipment used in the PLC 11, all transformers will move out of the allowable error voltage bandwidth together, although the decrease or increase in load demand may only require a change in tap position of one transformer. By including different skew constants for each transformer in the determination of the error voltage for each transformer, when such an increase or decrease occurs, only one transformer will change tap position.

In addition to determining when a transformer is out of the allowable error voltage bandwidth, the invention allows an adjustable time to pass before a change in the tap position of a transformer is permitted so that transient voltage changes are not responded to. When an out of error voltage bandwidth condition occurs, there is a relatively long time delay before the change in tap position of a transformer will be permitted. However, if after the initial tap change, the error voltage is still out of range, a shorter delay will be used for subsequent tap changes. This methodology allows the system to respond faster to large changes in system voltage fluctuations while limiting taps changes for spurious changes in the load demand.

The PLC 11 also prevents the tap positions of the transformers from exceeding or falling below a predetermined maximum or minimum. The PLC 11 checks that changing the tap position of a transformer will not cause the tap position of the transformer to go below some minimum or above some maximum tap position, e.g., in a 17 tap position transformer, the lowest tap position that the system will allow the tap position to be changed to might be 2, and the upper limit might be 16.

The PLC 11 also prevents the relative difference in tap positions of the transformers operating in parallel from exceeding some predetermined limit. The PLC 11 prevents the relative tap positions of all the transformers operating in parallel from becoming greater than a certain limit while at the same time always permitting changes in the tap positions of the transformers when the change in tap position makes the relative difference of the tap positions smaller. For example, if the maximum allowable relative difference is 6, and transformer 20 has the tap position 9 and the transformer 22 has the tap position 15, a request to lower the tap position of transformer 20 or a request to raise the tap position of transformer 22 will be blocked, while a request to raise the tap position of transformer 20 or a request to lower the tap position of transformer 22 will not be blocked because of the relative difference of tap positions.

DETAILED DESCRIPTION

Figure 9:
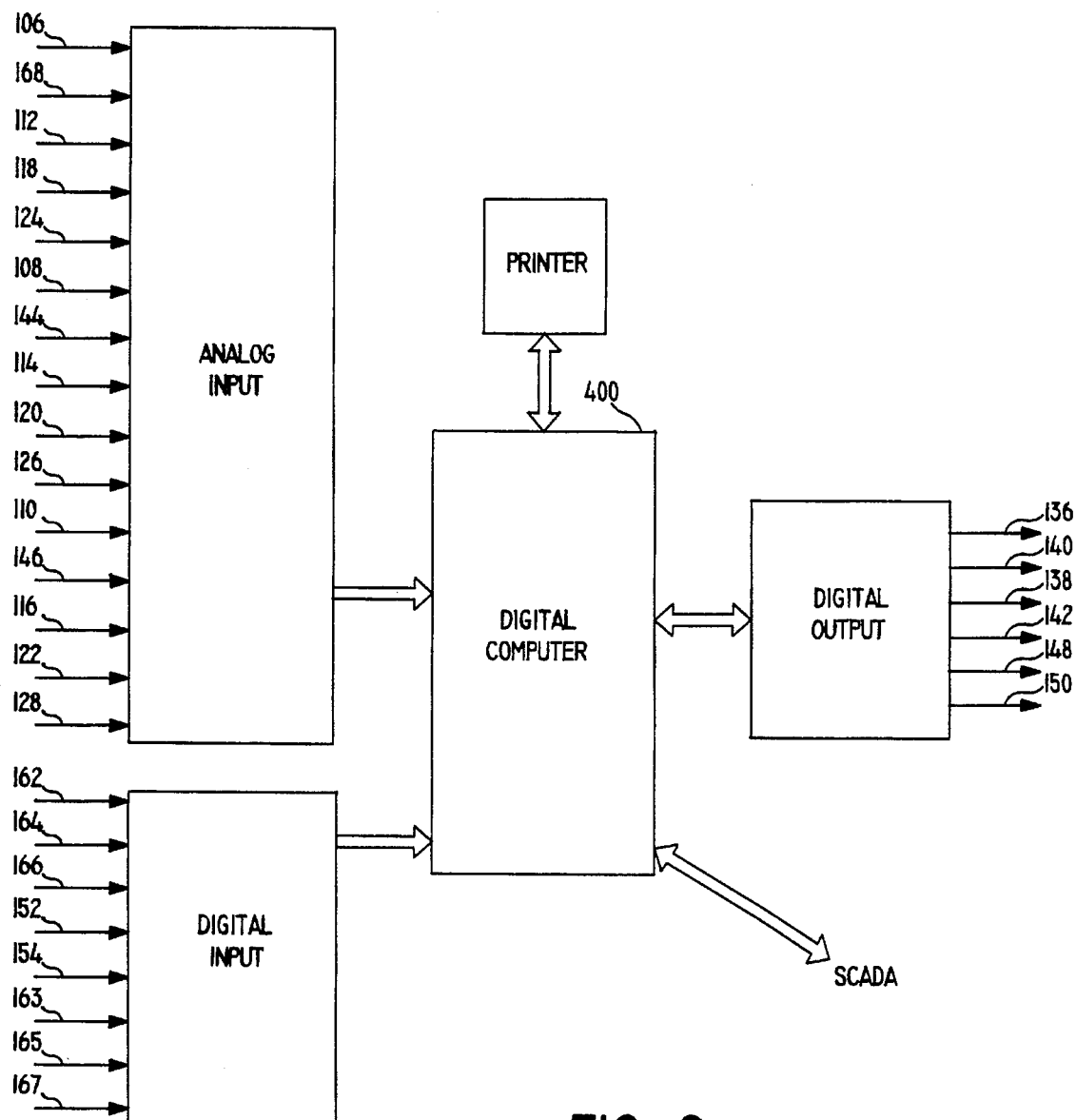
FIG. 9 is a diagram of another exemplary programmable logic controller.

An exemplary controller, programmable logic controller (PLC) 11, is illustrated in FIG. 1. The PLC 11 controls the tap positions of the three transformers 20, 22, and 24 in the exemplary power substation 10 as shown in FIG. 2. While in the preferred embodiment the PLC 11 is implemented with a programmable logic processor (PLP) 200 and ASCII BASIC module (ABM) 230, the PLC could be implemented by a digital computer 400 as shown in FIG. 9. The PLP 200 and ABM 230 could be replaced by a digital computer 400 such as an industrial workstation.

Figure 6:
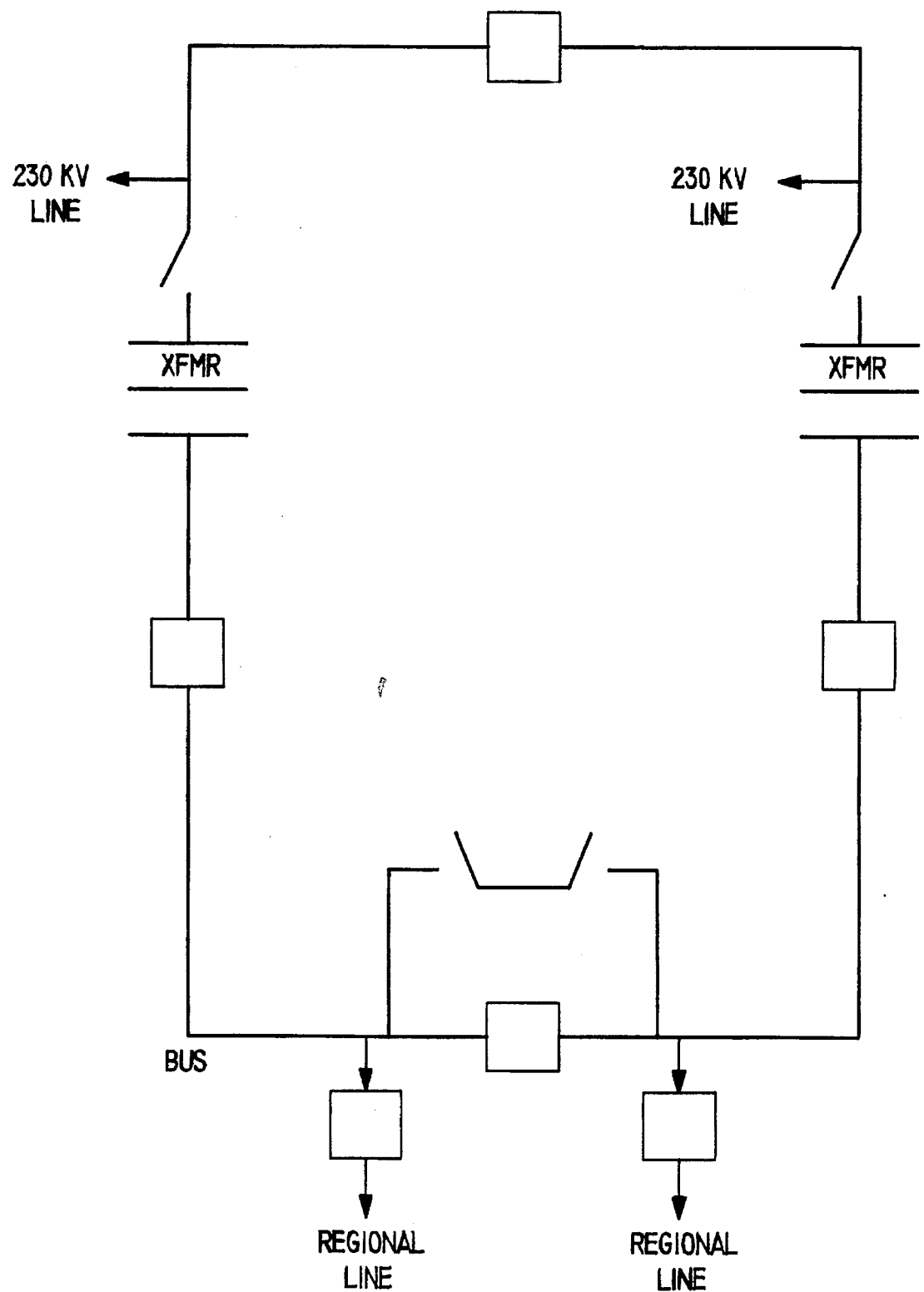
FIGS. 6, 7, and 8 are diagrams of other exemplary substation configurations that can be controlled by the preferred embodiment of this invention.
Figure 7:
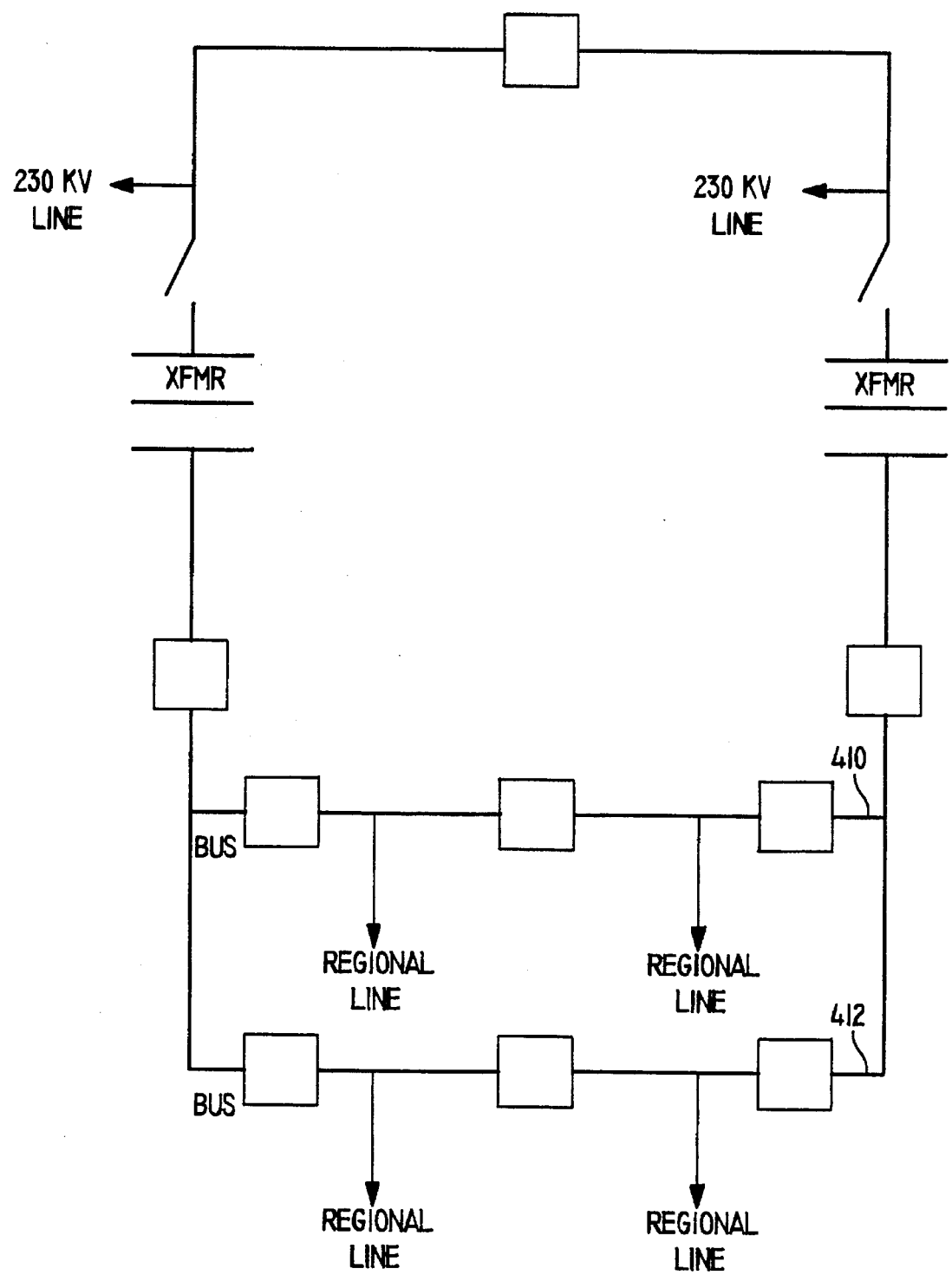
Figure 8:
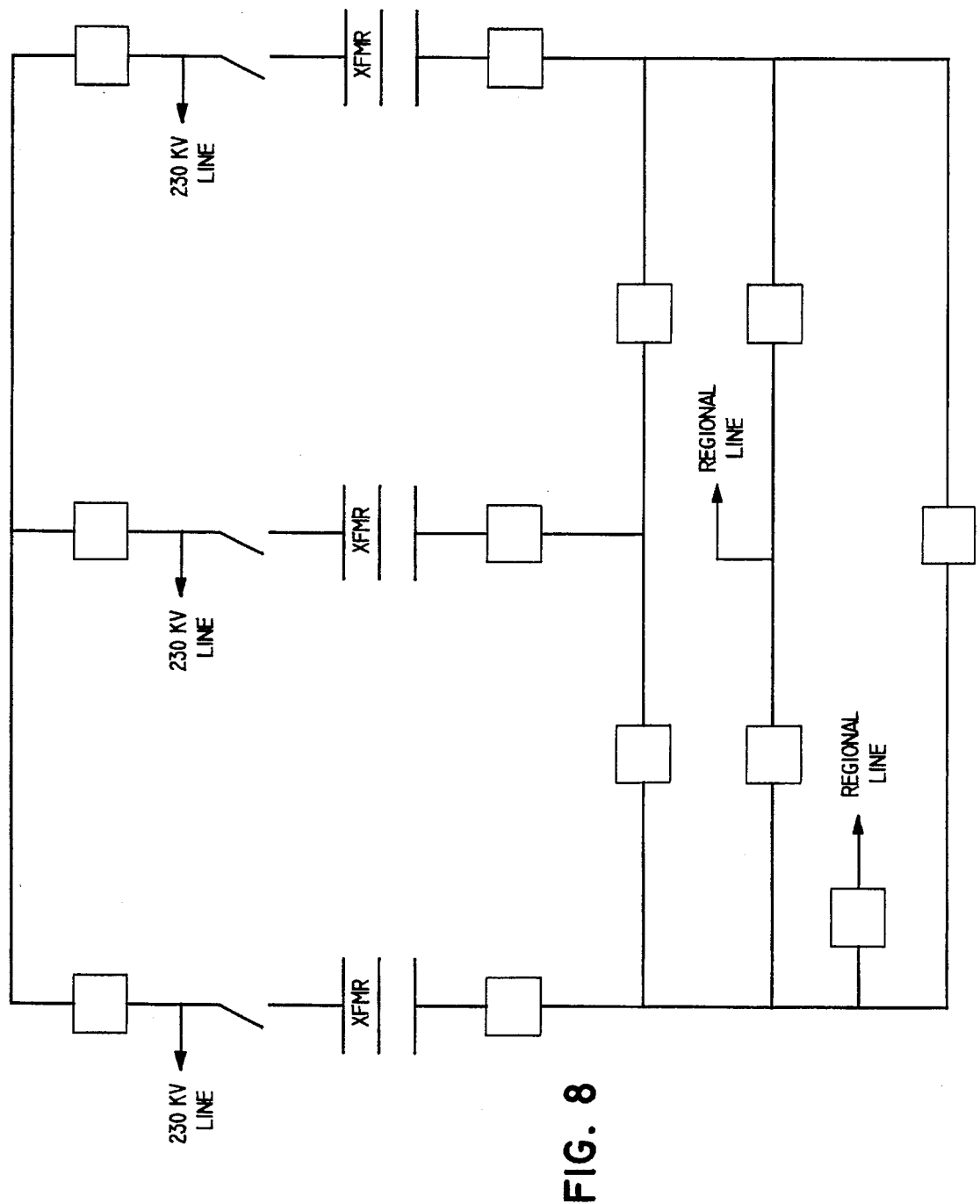

The same exemplary controller, PLC 11, described in detail below could be used in a variety of different substation configurations besides the exemplary substation configuration 10 . Examples of some other substation configurations that the PLC 11 described in detail below could control with no modifications are shown in FIGS. 6, 7, and 8.

In addition, the PLC 11 could be replaced by a microcomputer that had a series of analog and digital input ports and digital output ports. The ladder logic program (LLP) that will be described below could be cross compiled to another language such as C or BASIC that could function in the microcomputer. The BASIC program that will also be described below could also be cross compiled to another language such as C or remain in BASIC and be incorporated in the microcomputer along with the cross compiled version of the LLP program.

The substation configuration 10 shown in FIG. 2 is an example of one type of substation configuration. A substation is generally comprised of one or more bulk power lines, a high voltage bus, one or more transformers, one or more low side buses , and one or more regional supply lines. This typical power substation 10 is comprised mainly of three bulk power, 230 KV, lines 14, 16, and 18, three low side, 69 KV, buses 156, 158, and 160, three power transformers 20, 22, and 24, and a number of regional supply lines 157, 147, 155, and 161 which are connected to the low side buses.

The three power transformers 20, 22, and 24 are used to transform the voltage received from the three bulk power, 230 KV, lines 14, 16, and 18 to the voltage of the three low side, 69 KV, buses 156, 158, and 160. The transformers in this substation configuration are typically 230 KV to 69 KV transformers operating within ± 7.5% of their rated output by the use of taps which generally have the step size of 15/16% of the rated output voltage. These transformers are typically Y-Y connected but other configurations are possible.

In a power substation 10, the demand on the regional supply lines 157; 147, 155, and 161 normally varies during the day as the customers start or stop electric apparatuses. The varying demand causes the voltage on the low side bus to deviate from the desired level. By raising or lowering the positions of the taps of the transformers, the output voltage of the bus is maintained at or near the desired level as the demand on the regional supply lines changes.

When the transformers are operating in parallel, one transformer might be providing a higher output voltage level than the other transformers. This causes a large amount of circulating reactive power (VAR) flow between the transformers. Ideally, each transformer should be operating with the same numerical turns ratio, if their high side and low sides are tied together.

The primary function of the PLC 11 is to control the positions of the transformers' taps maintain the desired voltage level while minimizing the level of the circulating VAR flow. In order for the programmable logic controller 11 to be able to control the position of the transformers' taps, the PLC 11 of this invention is provided with the configuration of the substation, i.e., which if any of the transformers are operating in parallel (either by hardwired connections or information from a global data area indicating the configuration of the substation), the high side and low side voltage levels, the MVAR and MW flows at the low side of each transformer in operation and the tap position of each transformer.

To determine the configuration of the power substation 10 shown in FIG. 2, the PLC 11 receives digital input signal(s) or with some substations the substation configuration is available from a global data area provided by a central controller for the entire substation, for the exemplary substation configuration, the PLC 11 receives eight digital input signals 163, 165, 167, 162, 164, 166, 152, and 154. For the first transformer 20, the digital input signal 162 indicates whether circuit breaker 26 is closed. Circuit breaker 26 is used to protect the transformer 20. The digital signal 162 from the circuit breaker 26 is raised high if circuit breaker 26 is closed, is set low if the circuit breaker 26 is open.

Digital signals 164 and 166 also operate in a similar manner. When circuit breaker 28 is closed, the digital signal 164 is raised high to indicate that the transformer 22 is in operation, i.e., that the transformer 22 is connected to the low voltage bus 158. Also, when circuit breaker 30 is closed the digital signal 166 is raised high to indicate that the transformer 24 is in operation, i.e., that the transformer 24 is connected to the low voltage bus 160. Likewise, if there were more or less transformers in the substation configuration than the three in substation 10, there would a digital input signal for each transformer to indicate if the transformer was in operation.

Digital Signals 163, 165, and 167 also operate in a similar manner. Digital signal 163 is raised high when switch 36 is closed. When digital signal 163 is raised high, this indicates that the high side of the transformer 20 is connected to the bulk power line 14. Likewise, digital signal 165 is raised high when switch 38 is closed. When digital signal 165 is raised high, this indicates that the high side of the transformer 22 is connected to the bulk power line 16. Also, digital signal 167 is raised high when switch 40 is closed. When digital signal 167 is raised high, this indicates that the high side of the transformer 24 is connected to the bulk power line 18. If the substation had more or less transformers than the substation 10, there would be a digital input signal for each high side transformer switch.

Digital signals 152 and 154 also operate in a similar manner and are used to indicate whether the low side buses and, thus, the low side of the transformers are connected together. Digital signal 152 is raised high when either tie switch 102 or circuit breaker 32 are closed. When digital signal 152 is raised high, this indicates that low side bus 156 is electrically connected to low side bus 158. Likewise, digital signal 154 is raised high when either tie switch 104 or circuit breaker 34 are closed. When digital signal 154 is raised high, this indicates that low side bus 158 is electrically connected to low side bus 160. If the substation had more or less low side buses or a different interconnection between the low side buses than the substation 10, there would be a digital input signal for each interconnection between the low side buses.

Based on the value of all of the digital input signals (eight for substation 10), the PLC 11 can determine the operative status of the transformers. For all three transformers 20, 22, and 24 to be operating in parallel, all the digital input signals 163, 165, 167, 162, 164, 166, 152, and 154 must be raised high. If all of the digital inputs signals are raised high, this indicates that all three transformers are operating in parallel, i.e., their low sides are connected to the low side buses and low side bus 156 is connected to the low side bus 158, and the low side bus 158 is connected to the low side bus 160. The transformers are considered to be operating in parallel regardless of whether their high sides are connected to the high side bus 12.

Thus, based on the eight digital input signals 163, 165, 167, 162, 164, 166, 152, and 154, the PLC 11 can determine which transformers are operating and which, if any, of the transformers are operating in parallel in substation 10.

The invention controls the position of the transformers' taps in response to changing load demands, i.e., increased power use. To accomplish this, the PLC 11 uses the actual voltage levels of the low side buses and the MVAR flows of each transformer in addition to the transformer configurations as described above. The PLC 11 uses several other analog input signals from a power substation for enhanced operation.

These other analog input signals are comprised of the high side voltage level, the transformer tap position, and the MegaWatt (MW) level. All analog input signals are generated from devices electrically coupled to the buses and transformers.

The high side voltage level 106 for transformer 20 is produced by use of a voltage transformer 54 and a voltage transducer 48. The voltage transformer 54 senses the voltage level and provides an electrical signal representative of the sensed level to the voltage transducer 48.

The transformer 54 steps down the level of the electrical signal from the 230 KV range to a level that represents the high voltage level but is also within the range that the voltage transducer 48 can process.

The voltage transducer 48 receives the stepped down signal from the voltage transformer 54 and produces an analog signal 106. The analog signal 106 can be converted by the use of a constant that represents the linear change in value of high side voltage level by the voltage transformer 54 and the voltage transducer 48.

The tap position 168 for transformer 20 is produced by use of a tap position transducer 60 connected to an output of the transformer 20 control system that is representative of the tap position of the transformer. The tap position transducer 60 receives a signal that is representative of the tap position of the transformer 20 and produces an analog signal 168 that varies as a function of the value of that representative signal. The analog signal 168 can be converted to the actual tap position number by the use of a constant that represents the linear change in value of actual tap position as represented by the signal produced by transformer 20 and transformed by tap position transducer 60.

The low side bus voltage level 124 for transformer 20 is produced by use of a voltage transformer 78 and a voltage transducer 84. The voltage transformer 78 senses the voltage level and provides an electrical signal representative of the sensed level to the voltage transducer 84.

The voltage transformer 78 steps down the signal level from the 69 KV range to a level within the range that can be processed by the voltage transducer 84 and the MW/MVAR transducer 72.

The voltage transducer 84 receives the stepped down signal from the voltage transformer 78 and produces an analog signal 124 that varies as a function of the value of the stepped down voltage. The analog signal 124 can be converted by the use of a constant that represents the linear change in value of low side bus voltage by the voltage transformer 78 and the voltage transducer 84.

The MW level 112 and the MVAR level 118 for the low side of transformer 20 are produced by use of the voltage transformer 78, the current transformer 90, and the MW/MVAR transducer 72. The voltage transformer 78 senses the voltage level and provides an electrical signal representative of the sensed level of the voltage from the transformer 20 connected to the low side bus 156 to the MW/MVAR transducer 72. The current transformer 90 provides an electrical signal representative of the sensed level of the current of the low side of transformer 20 to the MW/MVAR transducer 72.

As above, the voltage transformer 78 steps down the signal to a level that while still representative of the low side bus voltage level is also within the range that can be processed by the voltage transducer 84 and the MW/MVAR transducer 72.

The MW/MVAR transducer 72 receives the stepped down voltage signal from the voltage transformer 78 and the stepped down current from the current transformer 90 and produces analog signals proportional to the low side MW 112 and MVAR 118. The analog signal MW 112 can be converted by the use of a constant that represents the linear change in value of low side bus voltage and low side transformer current by the voltage transformer 78, the current transformer 90, and the MW/MVAR transducer 72. Likewise, the analog signal MVAR 118 can be converted by the use of a constant that represents the linear change in value of the low side bus voltage and low side transformer current by the voltage transformer 78, the current transformer 90, and the MW/MVAR transducer 72.

The analog inputs for transformer 22 are also comprised of the high side voltage level 108, the tap position 144, the MegaWatt (MW) level 114, the reactive power (MVAR) level 120, and the low side bus voltage level 126 where the analog inputs are similarly generated from devices electrically coupled to the buses and transformers. The high side voltage level 108 for transformer 22 is produced by use of a voltage transformer 56 and a voltage transducer 50. The tap position 144 for transformer 22 is produced by use of a tap position transducer 62 connected to an output of the transformer 22 that is representative of the tap position of the transformer. The low side bus voltage level 126 for transformer 22 is produced by use of a voltage transformer 80 and a voltage transducer 86. The MW level 114 and the MVAR level 120 for the low side transformer 22 are produced by use of the voltage transformer 80, a current transformer 92, and the MW/MVAR transducer 74.

The analog inputs for transformer 24 are also comprised of the high side voltage level 110, the tap position 146, the MegaWatt (MW) level 116, the reactive power (MVAR) level 122, and the low side bus voltage level 128 where the analog inputs are similarly generated from devices electrically coupled to the buses and transformers. The high side voltage level 110 for transformer 24 is produced by use of a voltage transformer 58 and a voltage transducer 52. The tap position 146 for transformer 24 is produced by use of a tap position transducer 64 connected to an output of the transformer 24 that is representative of the tap position of the transformer. The low side voltage level 128 for transformer 24 is produced by use of a voltage transformer 82 and a voltage transducer 88. The MW level 116 and the MVAR level 122 for the low side transformer 24 are produced by use of the voltage transformer 82, a current transformer 49, and a MW/MVAR transducer 76.

In a substation configuration which had more or less transformers than the configuration in substation 10, there would be similar analog inputs for each transformer, i.e. the high side voltage level, tap position, low side bus voltage level, low side transformer MW level, and low side transformer MVAR level.

As illustrated in FIG. 1, the PLC 11 includes a number of devices which take the analog signals and digital signals described above, processes these signals and generates output signals which cause the transformers to either raise or lower their tap position and also generates printed output. The actual devices that make up the PLC 11 in the exemplary embodiment are two 8 point analog input cards which are represented as analog input 210 in FIG. 1, a 32 point 24 VDC input card represented as digital input 220 in FIG. 1, an ASCII Basic Module represented as ASCII basic module 230 in FIG. 1, a programmable logic processor w/6K memory, executive module, and 7 slot chassis represented as programmable logic processor 200 in FIG. 1, a 32 point 24 VDC output card represented as digital output 250 in FIG. 1, and a printer represented as printer 240 in FIG. 1.

PROGRAMMABLE LOGIC PROCESSOR (PLP)

The programmable logic processor (PLP) 200 is the main controlling device in the PLC 11 in the exemplary embodiment. The PLP 200 directs the analog input 210 to store the analog signals it receives through input ports into storage devices (registers). The PLP 200 directs the digital input 220 to store the digital signals it receives through input ports into storage devices (coils). The PLP uses the analog signals and digital signals stored by the analog input 210 and the digital input 220 into coils and registers to determine which if any of the tap positions of the transformers should be changed. The PLP 200 places the requests for changes in the tap position of the transformers into registers and coils which are used by the digital output 250 to generate digital output signals which in turn will be used to cause the tap position of a transformer to change.

The PLP 200 is a ladder logic program (LLP) which is comprised of a number of networks (114 in the exemplary embodiment). A copy of the actual LLP is included in the Appendix to this patent. Each of the networks is operated in sequence from the first network to the last network and then back to the first network. However, the order of the networks is not critical, it is possible that the networks could be shuffled in order and the PLP 200 would still operate as intended. Each of the networks performs a specific set of functions that are related to the processing that is performed by the PLP 200 as described above.

Network 1 in the LLP executed by the PLP 200 determines whether the ASCII basic module 230 is operating and blocks the changing of the taps if it is not operating. This network monitors a coil which is toggled by the ASCII basic module 230 to determine if the ASCII basic module 230 is operating. The network attempts to restart the ASCII basic module 230 if it is not operating. While the ASCII basic module 230 is not operating, the positions of the taps is not permitted to change since it is the ASCII basic module 230 that determines whether the tap position for each transformer should be raised or lowered.

Networks 2,3 and 11 in the LLP executed by the PLP 200 check if the low voltage bus voltage levels are within predetermined limits (a low and high limit) and set an alarm if they are outside a predetermined limit. These networks verify that analog input signals 124, 126, and 128 representing the voltage level of each bus 156, 158, and 160 are within a predetermined range. The network 11 will set an alarm coil if any of the levels are not within a predetermined range since then these analog signals would be suspect and should not be used to determine whether the tap position in any of the transformers should change.

Networks 4, 5, 6 and 12 in the LLP executed by the PLP 200 check if the transformer high side voltage levels are within predetermined limits (a low and high limit) and sets an alarm if they are outside a predetermined limit. These networks verify that analog input signals 106, 108, and 110 representing the high side voltage level of each transformer 20, 22, and 24 are within a predetermined range. The network 12 will set an alarm coil if any of the levels are outside of the allowable range.

Networks 7, 8, 9, and 10 in the LLP executed by the PLP 200 set an alarm if any of the tap positions of the transformers are beyond predetermined limits. The analog inputs signals 168, 144, and 146 represents the tap positions of the transformers 20, 22, and 24, respectively. The network does not permit the tap position within any transformer to go below some minimum number or above some maximum number where these numbers can vary for each transformer. For example, if transformer 20 has 17 tap positions, these networks might prevent the tap position for transformer 20 from going below 2 or above 16. If the tap position of any of the transformers is at a limit an alarm coil is set to prevent that tap from moving below or above the limit while not stopping a tap from being position further away 10 from the limit, i.e. if the tap position for a transformer is 2 in the example given above, the tap would be permitted to move to position 3, but not to position 1.

Networks 11 and 12 in the LLP executed by the PLP 200 set an alarm if the low voltage bus voltage level or the transformer high side voltage levels are not within predetermined limits as described above in networks 2, 3, 4, 5 and 6.

Network 13 in the LLP executed by the PLP 200 prevents the tap positions from being changed when bad analog data is detected. As described above for networks 2, 3, 4, 5 or 6, it is possible that the data is out of range due to bad analog data (e.g., due to a failure of voltage transformer or voltage transducer).

Network 14 in the LLP executed by the PLP 200 determines the configuration of the substation based on the digital inputs signals stored in coils. This network analyzes the information in the coils and determine which transformers are in service (operational) and which transformers, if any, are operating in parallel. The process for determining the substation configuration based on the digital input signals was described earlier in detail. The substation configuration determination is 10 used by the ASCII basic module 230.

Network 15 in the LLP executed by the PLP 200 is used to trigger the enhanced printing mode and to determine if there is any failure of the PLC 11. The enhanced printing mode is selected when an alarm condition is present. The enhanced printing mode selection is used by the ASCII basic module 230 where the printing commands are performed. The failure checking of the PLC 11 is an internal check of the hardware status.

Network 16 in the LLP executed by the PLP 200 checks whether each transformer is in service. Each transformer has a three position switch by which the transformer can be operated in manual, automatic, or independent mode. In manual mode, the tap positions are not changed by the PLC 11. In automatic mode, the PLC 11 changes the tap positions when it determined necessary to do so based on all available inputs, and in independent mode, the transformer is not considered to be operating in parallel and thus the ASCII basic module 230 is informed that the transformer is not operating in parallel regardless of the actual substation configuration and this transformer's taps are changed based on voltage inputs only.

Network 17 in the LLP executed by the PLP 200 to convert data stored in coils for use by the ASCII basic module 230. The data stored in coils in the PLP 200 must be converted to a register format readable by the ASCII basic module (ABM) 230 before the data is transmitted to the ABM 230 by the data bus 225.

Networks 18, 19, 20 and 21 in the LLP executed by the PLP 200 are used to set one of seven coils depending on the day of the week, so that these coils can be used by other networks when active.

Networks 22-33 in the LLP executed by the PLP 200 are used to establish time clocks. Time clocks are used to automatically add bias voltages which can be positive or negative to the low side bus voltage levels. When a time clock is on, a predetermined bias value, which is passed to the ABM 230 will be added the bias to the value of the low side bus voltage level. This is done so that at certain points during the day or week, the transformers' output voltages can be changed to compensate for the substation's varying load demand.

Network 34 in the LLP executed by the PLP 200 converts sixteen coils to a register used by the ABM 230. The register is passed to the ABM 230 over the data bus 225 and contains the on/off status of the time clocks.

Networks 35-38 in the LLP executed by the PLP 200 read information sent by Supervisory Control And Data Acquisition (SCADA) and set data in a register to be used by the ABM 230. SCADA data is sent and received by the PLP 200 over the data bus 255. These networks read and store the information received from the SCADA on the data bus 255. These networks also convert the data to a register that will read by the ABM 230 over the data bus 225.

Network 39 in the LLP executed by the PLP 200 calculates a value for the tap position for each transformer based on the analog signal representing the tap position. The value is used by the SCADA.

Networks 40, 41, 42, and 43 in the LLP executed by the PLP 200 establish a loop counter which holds data to be sent to the ABM 230 in a register until this section of the ladder program has executed four times. This compensates for latency problems due to the ABM's execution delay being about four times the delay in the ladder program.

Networks 44, 45, 46, 47, 48, 49, and 50 in the LLP executed by the PLP 200 enable data stored in registers for the ABM 230 to be transmitted over the data bus 225. These networks are used to properly delay and transmit register contents over the data bus 225 to the ABM 230. These networks work in conjunction with networks 40, 41, 42 and 43.

Network 51 in the LLP executed by the PLP 200 reads and decodes a register from the ABM 230 over the data bus 225 which indicates whether each transformer's tap position should be raised, lowered, or remain at its current position and also determines the delay before this information is output to the digital output 250. This network converts the register (TAPREG) from the ABM 230 which indicates whether each transformer's tap position should be raised, lowered, or remain at its current position.

When the network initially determines that TAPREG indicates that a tap position should change it starts the long delay timer to delay outputting the information to the digital output 250. Once this long delay is processed and the information sent to the digital output 250 over the data bus 245, if TAGREG still indicates an out of allowable error voltage bandwidth condition, the short delay timer is used for all subsequent tap changes until the output voltages are in band.

The two varying time delays, long and short, for tap position change requests are needed so that if any transformer's output voltage level is still out of the desired output voltage range after the long delay, the time delay before the request is made for the second and subsequent tap changes is smaller (the short delay). This enables the control methodology to respond faster to large changes in demand while not overshooting for small changes in demand. It is understood by those skilled in the art that there is a limit on how small the shorter delay can be depending on the time it takes for the transformer to change tap positions and the control system to reset.

Networks 52, 53, 54, and 55 in the LLP executed by the PLP 200 count the number of tap change operations for each transformer per unit time (as set in the field) and sets an alarm if the number of changes per unit time exceed a first predetermined limit (which can be set by the end user) and locks out the transformer if the number of changes per unit time exceed a second and higher predetermined limit (which can be set by the end user).

These networks increment a separate counter for each transformer each time a tap position is changed for the transformer. The counter is reset at the expiration of each unit of time and thus contains a count of tap positions changes per unit time. If the count of the tap position changes per unit time for a transformer exceeds a first predetermined limit, an alarm is set. If the count of the tap position changes per unit time for a transformer exceeds a second predetermined limit, the transformer is placed in a locked out state due to excessive operation. In the lockout state, the transformer is not permitted to make any further changes in tap position until the lockout is cleared at the end of the unit time.

Network 55 sets two different alarms if the other networks have determined that the tap position changing operations are excessive. There is an excessive operation alarm and an excessive operation lockout alarm. The excessive operation alarm is generated when any counter is close to reaching a lockout limit. The excessive operation lockout alarm is generated when any transformer is locked out.

As noted above, network 52 resets the counters automatically after a predetermined time and also resets the alarm and lockout conditions when this predetermined time has been reached. This permits the transformer's tap positions to be changed again after a predetermined time interval automatically without operator intervention.

Networks 56, 57 and 58 in the LLP executed by the PLP 200 issue the raise and lower signals for the transformers. If no other network has blocked the operation of a transformer, these networks will issue the raise and lower signals (if any) for each transformer that is not blocked by some other network.

Networks 59, 60, 61 and 62 in the LLP executed by the PLP 200 set the time period permitted for a transformer to change tap positions and set an alarm if the tap changing operation exceeds the time period. There are two time periods, normal and long, which are used in these networks since when the tap position moves through the neutral tap position it may take longer for the tap changing equipment to perform the change. Thus a longer time period is permitted for tap position changes that move through the neutral position.

For example, if a 17 tap position transformer (with a neutral position at 9) receives a raise request when the current tap position is 8, or receives a lower request when the current tap position is 10 or receives either a raise or lower request when the current tap position is 9, the tap position moves through the neutral position and a longer time period is permitted for the tap changing operation to take place.

If the time period permitted for changing the tap position is exceeded further operation of the transformer tap changer is blocked and an alarm is set.

Network 63 in the LLP executed by the PLP 200 checks whether the circulating MVARs for each transformer exceed a predetermined limit. This network checks the level of the circulating MVARs for each transformer. If the level of the circulating MVARs exceeds the limit for a predetermined time, an alarm is set and a message is printed.

Network 64 in the LLP executed by the PLP 200 sets two different coils. The first coil is set if a transformer is changing tap positions. The second coil is set if a transformer is stuck between tap positions or the time to change taps has exceeded the delay determined in an earlier network. These coils cause lights indicating lights on digital output 250 to be lit if they are set.

Network 65 in the LLP executed by the PLP 200 checks the status of PLC 11. This network checks the status of the PLP 200, the analog input 210, the digital input 220, the digital output 250, and ABM 230 and sets a failure alarm if a problem is detected.

Network 66 in the LLP executed by the PLP 200 converts the analog input signals 168, 144, and 146 which represent the tap positions of the transformers to numbers representing the actual tap positions.

Networks 67, 68, 69, and 70 in the LLP executed by the PLP 200 calculate the relative differences in tap positions between the transformers. If the differences between any pair of transformers exceeds a predetermined limit (which is set by the end user) then these networks do not permit operations which would cause the relative difference in tap positions to increase. These networks calculate the relative tap position difference between the various transformers. Then this difference is compared to a maximum permitted value. If that value is exceeded, operations are prohibited or blocked if they would cause the relative tap positions between the transformers which exceed the limit to increase. However, operations that would reduce the relative difference in the tap positions of those transformers are permitted. For example, if transformer 20 has the current tap position 8, and if transformer 22 has the current tap position 14, and the maximum relative difference that is permitted between transformers is 6, then an operation that requests transformer 20 to lower its tap position or an operation that requests transformer 22 to raise its tap position would be blocked. However, in the example, an operation that requests transformer 20 to raise its tap position or an operation that requests transformer 22 to lower its tap position would be permitted.

Network 71 in the LLP executed by the PLP 200 first clears the registers which will be eventually sent to the digital output 250. This network clears the registers by setting them to zero. Next, the output coils that represent alarms are loaded into their register. Finally, if the ABM 230 is running, this network will load the output coils that control tap changes into their register. Both registers are sent to the digital output 250 at the end of the current LLP scan.

Network 72 in the LLP executed by the PLP 200 monitors the operational status of the digital output 250, the paper supply to the printer 240, the internal battery of the PLC 200 and the integrity of the analog input voltage signals.

Network 73 in the LLP executed by the PLP 200 monitors the number of tap position changes for each transformer and sets an alarm when the transformer is due to have maintenance work performed, based on the number of tap position changes since the last maintenance on the transformer.

Network 74 in the LLP executed by the PLP 200 is used to synchronize the clock in the ABM 230 with the clock in the PLP 200.

Network 75 in the LLP executed by the PLP 200 converts certain substation specific inputs to the register format used by the PLP 200.

Network 76 in the LLP executed by the PLP 200 determines if a low side bus 156, 158, or 160 is out of service and blocks the associated low voltage alarm.

Networks 77, 78, and 79 in the LLP executed by the PLP 200 set coils indicating trouble with a low side bus or it associated transformer. The ABM 230 receives the status of this coil over data bus 225 and prints the status on the printer 240.

Networks 80, 81, 82, and 83 in the LLP executed by the PLP 200 are used to automatically adjust the internal PLP 200 clock for daylight savings time in the spring and standard time in the fall. This adjustment is necessary so that the time clock networks can accurately determine when to apply changes to the voltage schedule to account for anticipated increases or decreases in load demand, e.g., at the start of the business day and at the end of the business day.

Network 84 in the LLP executed by the PLP 200 works in conjunction with network 51 to determine when a short time delay should be used to change the tap position of a transformer.

Networks 85, 86 and 87 in the LLP executed by the PLP 200 monitor the high side voltage and MW flow for each transformer and block the operation of the tap changer if certain conditions are not met. The high side voltage, e.g., 106 for transformer 20, is monitored by these networks.

If the high side voltage exceeds a predetermined limit (which is set by the end user), a request to lower the tap position for that transformer is blocked until the voltage is below the predetermined limit. In addition, if the high side voltage falls below a predetermined limit (which is set by the end user), a request to raise the tap position for that transformer is blocked until the voltage is below the predetermined limit. These operations (raise or lower taps) are blocked since any attempt to correct the output voltage of the transformer when the high side voltage is beyond the predetermined limits (too high or too low) will only exacerbate the situation and could lead to a bulk power system voltage collapse.

The MW flow, e.g., 112 for transformer 20, is also monitored by these networks. If the MW is positive, i.e., the MW flow is from the low side to the high side (this condition can occur if the circuit breaker 35 is open and the low side bus is closed), a request to change the tap position for that transformer is blocked until the flow is negative, i.e., from the high side to the low side.

Network 88 in the LLP executed by the PLP 200 provides an indicator that the automatic operation for changing the tap position of a transformer is blocked in one or both directions.

Networks 89 and 90 in the LLP executed by the PLP 200 provide the actual determination of whether a request to raise or lower the tap position of a transformer should be blocked based on the alarms set by the other networks.

Network 91 in the LLP executed by the PLP 200 blocks the output of the maintenance alarm generated by an earlier network during the evening and early morning hours to prevent unnecessary callouts for maintenance.

The remaining networks in the LLP, networks 92 to 114 are used to determine the configuration of the substation by reading the global data area provided by a central controller for the entire substation. If there is no central controller for the entire substation, the substation configuration is set by the other networks in the LLP which use the hardwired connections to determine the current substation configuration.

Networks 92 to 97 in the LLP executed by the PLP 200 are used to read the status of the transformers and two controllers for each transformer from a global data area. There is a global data area that is set by other controllers used in the overall substation control methodology. The PLP 200 has access to the global data and reads the areas of the global data that indicate the status of the transformers and the two controllers for each transformer. There are two controllers for each transformer as part the tandem control methodology of the general substation control.

Networks 98 to 103 in the LLP executed by the PLP 200 are used to read the status of the tie bays (152 and 154 in the exemplary substation 10) and the two controllers for each tie bay from a global data area. The PLP 200 reads the areas of the global data that indicate the status of the tie bays and the two controllers for each tie bays. There are two controllers for each tie bay as part the tandem control methodology of the general substation control.

Networks 104 and 105 in the LLP executed by the PLP 200 are used to pack status information about PLC 11 into a register which will be placed in the global data area. The placement of status information about the PLC 11 in the global data area allows other controllers to read the global data area and determine the operating status of the PLC 11.

Networks 106 and 107 in the LLP executed by the PLP 200 are used to pack status information about PLC 11 into a register which will be transferred to SCADA over the data bus 255. The placement of status information about the PLC 11 on the data bus 255 allows the SCADA to receive the data and determine the operating status of the PLC 11.

Networks 108 and 109 in the LLP executed by the PLP 200 are used to determine the status of the transformers from the MODBUS+ based on the status from either of the two controllers for each transformer. The MODBUS+ also provides the status of the each transformer from each of the two controllers for each transformer. If the data from the first controller for a transformer is bad, then the data from the second controller for a transformer is used.

Network 110 in the LLP executed by the PLP 200 is used to determine the status of the tie bays in breaker and a half substations (where the two low side buses are separated by three breakers) from the MODBUS+ based on the status from either of the two controllers for each tie bay (410 and 412 in FIG. 7 are examples of tie bays). The MODBUS+ also provides the status of the each tie bay from each of the two controllers for each tie bay. If the data from the first controller for a tie 10 bay is bad, then the data from the second controller for a tie bay is used.

Network 111, 112, and 113 in the LLP executed by the PLP 200 read and convert registers from the SCADA which represent commands and act on the commands in the registers. The SCADA sends commands to the PLC 11 in two registers. The registers are received by the PLC 11 and converted to a format that the PLP 200 can read. The PLP 200 reads the registers and acts on the commands in the registers if any.

Last, network 114 in the LLP executed by the PLP 200 reads the status information from the MODBUS+ about the controllers for the transformers and tie bays and blocks operation of the tap changes if both controllers for any of the transformers or tie bays is not functioning. If both controllers for a particular device, transformer or tie bay, is not operative, the status of the transformer or tie bay will not be available. In this circumstance, no tap changing operations will be permitted since the operating configuration of the substation is not known.

Based on data sent to the ABM 230 from the PLP 200, the ABM 230 calculates whether the tap position for each transformer should be lowered, raised, or should remain in the same position. The analog input 210 converts the analog signal from the various voltage and power transducers into binary coded decimal (BCD) count values and sends them to the PLP 200 over data bus 205. These converted signals are transferred from registers in the PLP 200 over the data bus 225 into registers in the ABM 230.

The networks provide constants and the substation configuration to the ABM 230 by placing the information in designated registers in the PLP 200 and sending the information in the registers over the data bus 225 to designated registers in the ABM 230.

ASCII BASIC MODULE (ABM)

The ABM 230 processes the information transferred from the PLP 200 over the data bus 225 into registers and sets the register TAPREG. The register TAPREG contains the information indicating whether the tap position of each transformer should be lowered, raised, or remain unchanged.

The register TAPREG is transferred to a designated register in the PLP 200 over the data bus 225. The PLP 200 uses the register TAPREG along with other information to perform a number of other tests as detailed in the description of the individuals networks to determine whether the tap positions of transformers should be changed and then generates digital output signals to cause a transformer tap changer to either raise or lower the tap position from its current position.

Figure 4:
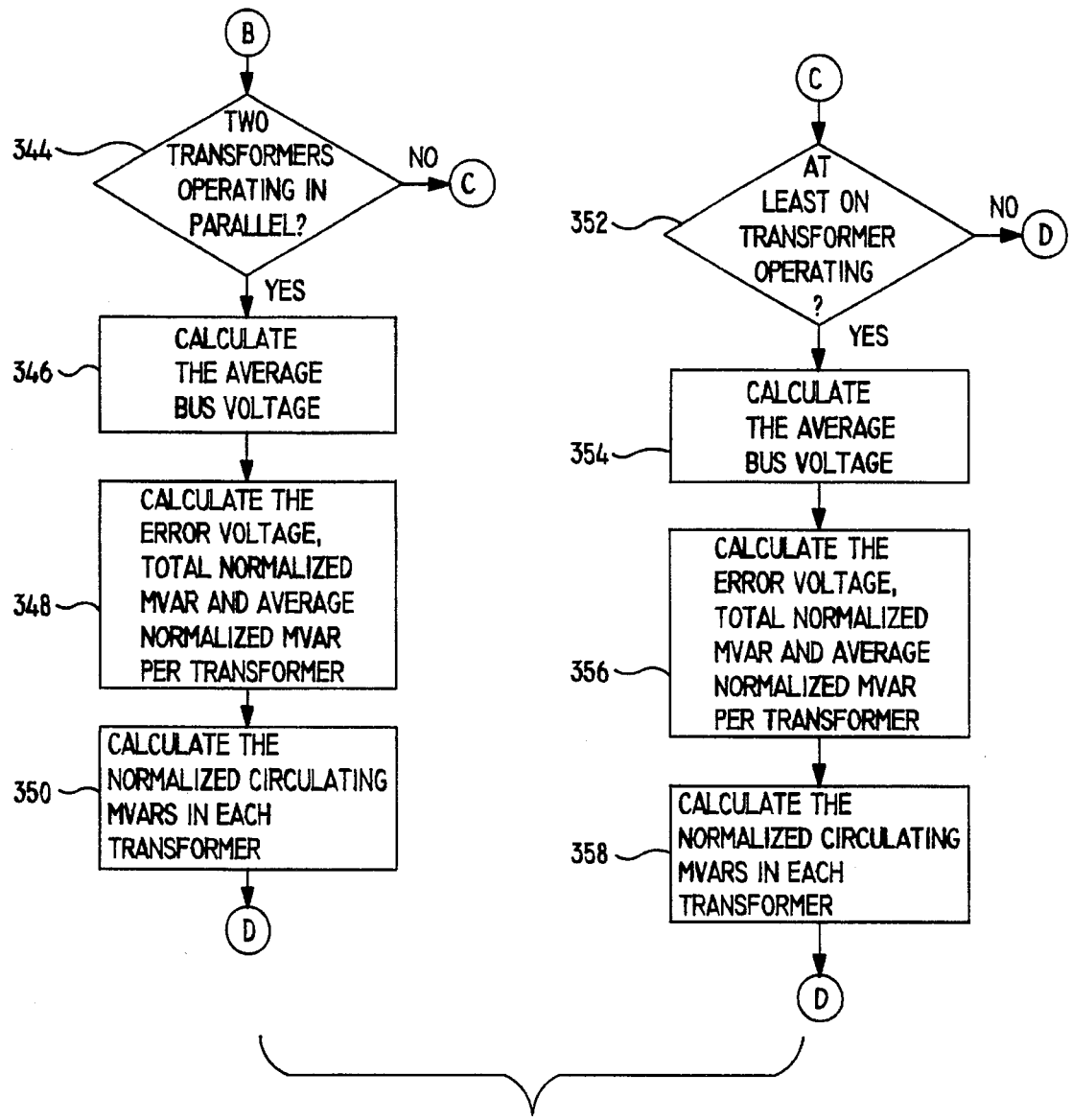
Figure 5:
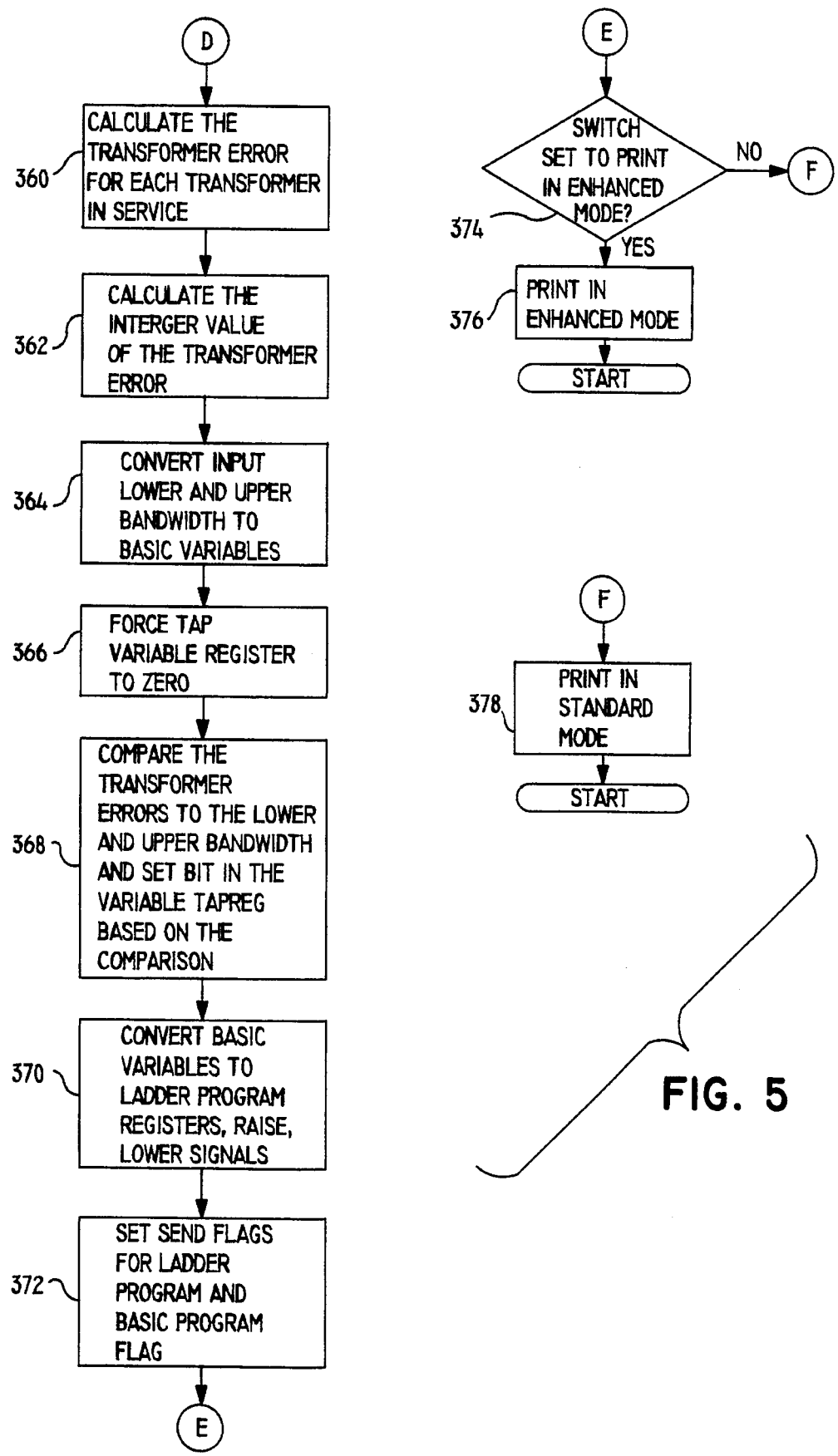

The ABM 230 sets the value of the register TAPREG by processing the data sent over the data bus 225 from the PLP 200. The ABM 230 is a microprocessor that is programmed in the language BASIC. The actual BASIC program that is executed in the ABM 230 is included in this patent application at the end of the specification. The BASIC program performs a number of logical and mathematical operations to determine the proper setting of the register TAPREG. Those operations which the BASIC program lists and are performed by the ABM 230 will be explained with the aid of FIGS. 3, 4 and 5 which are flowcharts of the BASIC program.

Figure 3:
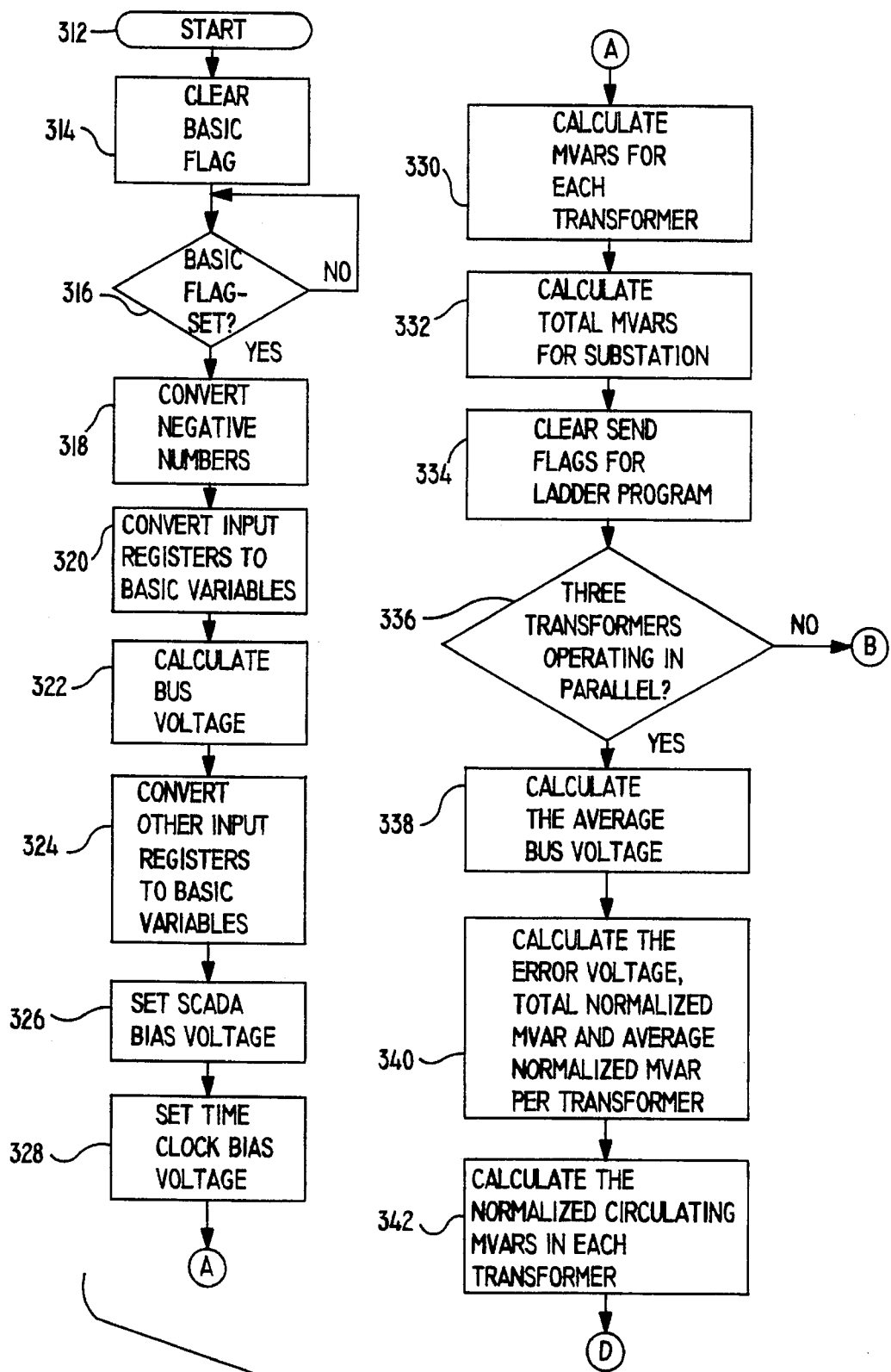
FIGS. 3, 4, and 5 are a flowchart of the program which is executed in the ASCII BASIC Module 230 in the programmable logic controller 11.

AS shown in FIG. 3, step 314 clears a flag at the start if the program. The PLP 200 sends data to the ABM 230 by placing the data in registers which are transferred to registers in the ABM 230. However, the PLP 200 does not send all the registers at once, but register contents are sent as the PLP 200 executes different networks in the ladder program. Therefore to insure that the PLP 200 has sent all the registers that the ABM 230 needs to operate, the PLP 200 sets a flag to tell the ABM 230 that all the registers have been sent. In step 316, the ABM 230 waits until the flag is set by the PLP 200 before performing any further operations.

Lines 110 to 180, step 318, contain the instructions which convert the numbers in registers that can be negative to the format the ABM 230 recognizes as negative. The numbers are sent by the PLP 200 in 2's complement form. The converted negative numbers are assigned to variables stored in the temporary memory or random access memory (RAM) of the ABM 230.

Lines 190 to 310, step 320, contain the instructions for scaling and then assigning other registers into variables stored in the RAM of the ABM 230. The registers contain data sent from the PLP 200 to the ABM 230.

Lines 320 to 430, step 322, contain the instructions which average the various low side bus voltage levels based on the location of the voltage transformers and the real-time configuration of the substation. In this embodiment REG(51) contains the real-time configuration of the substation, REG(51)'s 6, 7, and 8th bits (considering the first bit as bit 1) are set to 1 if the voltage transformer 78, 80, and 82 are installed for bus 156, 158, and 160, respectively.

For example, if the voltage transformer for a low side bus is not installed the low side bus voltage for a power transformer connected to that bus is calculated based on which voltage transformers are connected to that bus via closed breakers or switches. In this embodiment, REG(22)'s 1, 2, 3, and 4 bits contain the information of which, if any, transformers are operating in parallel, i.e., connected together to on one or more low'side bus. If bit 1 is set, then only transformer 20 and transformer 22 are operating in parallel, i.e. connected by one or more low side bus. If bit 2 is set, then only transformer 20 and transformer 24 are operating in parallel. If bit 3 is set, then only transformer 22 and transformer 24 are operating in parallel. If bit 4 is set, then transformer 20, transformer 22, and transformer 24 are operating in parallel, i.e., are connected by one or more low side bus, and if none of these bits are set none of the transformers are operating in parallel.

Thus, for example, if voltage transformer 78 is not installed, the voltage level for low side bus 156 will be set to the averaged level of low side bus 158 and the level of low side bus 160 if all three transformers are operating in parallel, more particularly $$VBUS1=(VBUS2+VBUS3)/2,$$

where VBUS1, VBUS2, and VBUS2 represent the voltage levels for low side buses 156, 158 and 160, respectively. If only transformer 20 is operating in parallel with transformer 24, then the voltage level of bus 156 will be set equal to the voltage level of bus 160, more particularly, $$VBUS1=VBUS3.$$

Likewise, if only transformer 20 is operating in parallel with transformer 22, then the voltage level of bus 156 will be set equal to the voltage level of bus 158, more particularly, $$VBUS1=VBUS2.$$

A similar calculation is made if one of other voltage transformers (80 or 82) is not installed.

Lines 440 to 470, step 324, contain the instructions which scale and assign a number of other registers to variables that are stored in the ABM 230 RAM.

Lines 480 to 520, step 326, contain the instructions that set a variable, SCADAB 326, to the bias voltage commanded by SCADA as determined by the value of the variable SREG. A number of different bias values can be set by the SCADA data bus 255. These values are transferred from the PLP 200 to the ABM 230. The variable SCADAB is used to add a bias to the error voltage calculated for each transformer as will discussed below.

Lines 530 to 580, step 328, contain the instructions which set the level of the TCBIAS, the time clock bias voltage. As described in the networks for the ladder program executed in the PLP 200, there are time clocks which when turned on sets coils which are sent to the ABM 230 as TCREG. The register is used to determine which time clock biases should be added to the variable TCBIAS. The function of the variable TCBIAS is similar to variable SCADAB, except the variable TCBIAS is changed automatically, i.e., without any operator intervention.

Lines 590 to 610, step 330, contain the instructions which set the values of the variables MVART1, MVART2, and MVART3, where these variables contain the MVAR flow for transformer 20, 22, and 24. The values are converted-from the BCD format of the PLP 200 to the actual engineering units of MVAR flow for each transformer.

For example, to convert the register which was transferred from the PLP 200 (REG(2)) to the variable MVART1, REG(2) less 2048 is multiplied by the variable K31, more particularly, $$MVART1=(REG(2)-2048) * K31.$$

where "2048" is the transducer offset, i.e., the number of counts corresponding to an MVAR flow of zero. The variable K31 is the MVAR/count conversion constant. The same conversion process is performed for the other variables MVART2 and MVART3.

Line 620, step 332, contains the instruction which calculates the total MVAR load for the substation 10. The variable TVAR is set equal to the sum of the variables MVART1, MVART2, and MVART3 which were described above, more particularly, $$TVAR=MVART1+MVART2+MVART3.$$

where MVART1, MVART2, and MVART3 are the MVAR flow measured by the MW/MVAR transducers at the low side of each transformer and represented by the analog signals 118, 120, and 122.

Line 630, step 334, contains the instruction which clears flags sent to the PLP 200. The flags, SND(1) to SND(4), are used to inform the PLP 200 that the ABM 230 has received the registers sent from the PLP 200 over the data bus 225.

Line 650, step 336, contains the instruction which determines whether all three transformers are operating in parallel, i.e. their low sides are connected. As stated above, REG(22)'s 1, 2, 3, and 4 bits contain the information of whether the transformers are operating in parallel. If bit 1 is set, then only transformer 20 and transformer 22 are operating in parallel. If bit 2 is set, then only transformer 20 and transformer 24 are operating in parallel. If bit 3 is set, then only transformer 22 and transformer 24 are operating in parallel. If bit 4 is set, then transformer 20, transformer 22, and transformer 24 are operating in parallel, and if none of these bits are set none of the transformers are operating in parallel. Thus, this instruction checks whether the fourth bit is set, and if not the program to skips to line 780, otherwise the 10 program proceeds to line 660.

Line 660, step 338, contains the instruction which calculates the average low side bus voltage. The average low side bus voltage for three transformers operating in parallel is equal the sum of the low side voltage level for each transformer divided by the number of transformers. In this case, there are three transformers operating in parallel with the low side bus voltage for each low side bus represented by the variables VBUS1, VBUS2, and VBUS3, respectively. The variable VBAVE is set equal to the sum of the these variables divided by 3, the number of transformers, more particularly, $$VBAVE=(VBUS1+VBUS2+VBUS3)/3.$$

Lines 670 to 720, step 340, contains the instructions which determine the error voltage for each transformer, the total normalized MVAR flow of the transformers operating in parallel, and the average normalized MVAR flow per transformer. For three transformers operating in parallel, the error voltage, VERR1, VERR2, and VERR3 are all equal to the average low side bus voltage, VBAVE, less the nominal low side bus voltage schedule, VNOM less the SCADA bias voltage, SCADAB, less the time clock bias voltage, TCBIAS, more particularly, $$VERR1=VBAVE-VNOM-SCADAB-TCBIAS,$$

$$VERR2=VBAVE-VNOM-SCADAB-TCBIAS, \text{ and}$$

$$VERR3=VBAVE-VNOM-SCADAB-TCBIAS.$$

As described earlier, there are several bias voltage variables, namely, SCARAB and TCBIAS, which are used to purposely cause the low side bus voltage to be different from the nominal low side bus voltage schedule which is represented by the variable VNOM.

The total MVAR flow for all the transformers is then calculated as the normalized sum of the measured MVAR flow at the low side of each transformer. The variable TMVAR is set equal to the sum of the low side MVAR flow for each transformer multiplied by a normalizing factor, K51, K52 or K53 for MVART1, MVART2, and MVART3, respectively, more particularly, $$TMVAR=MVART1*K51+MVART2*K52+MVART3*K53.$$

The normalizing constants, K51, K52, and K53 are the normalized impedances of the transformers, where the impedance ratios are normalized so the lowest impedance value is set to 1. The MVAR flow level for each transformer is weighted by its respective normalized impedance since the MVAR flow for each transformer operating in parallel is inversely proportional to the impedance transformer.

Lastly, these group of lines, step 340, calculate the average normalized MVAR flow per transformer (line 720). The variable AMVAR is set equal to the variable TMVAR divided by 3, the number of transformers operating in parallel, more particularly, $$AMVAR=TMVAR/3.$$

CALCULATING THE NORMALIZED CIRCULATING MVARS FOR EACH TRANSFORMER OPERATING IN PARALLEL

Lines 730 to 750, step 342, contain the instructions which calculate the normalized circulating MVAR flow in each transformer. The normalized circulating MVAR flow for each transformer is equal to the normalized MVAR flow for each transformer less the average normalized MVAR flow for all the transformer operating in parallel, AMVAR, more particularly, $$T1CVAR=MVART1 * K51-AMVAR,$$

$$T2CVAR=MVART2 * K52-AMVAR, \text{ and}$$

$$T3CVAR=MVART3 * K53-AMVAR.$$

The variables T1CVAR, T2CVAR, and T3CVAR (shown above) are set equal to normalized circulating MVAR flow for transformer 20, 22, and 24, respectively.

Line 760 contains the instruction which causes the program to branch to line 1280 which is the start of the area of the program that determines whether the tap position for each transformer should be changed.

Lines 790 to 880, 920 to 1010, and 1050 to 1140 contain the instructions for determing the error voltage and normalized circulating MVAR flow for each transformer when only transformers 22 and 24 are operating in parallel, only transformers 20 and 24 are operating in parallel, and only transformers 20 and 22 are operating in parallel, respectively. The operations performed are similar in each case to the previous example for all three transformers operating in parallel, except that the normalized circulating MVAR flow of the transformer that is not in parallel operation is set equal to zero. Also, its normalized MVAR flow is not used in the calculation of TMVAR. Finally, the low side bus voltage averaging is modified to reflect which voltage transformers are associated with the various transformer low sides. Thus only the operations performed (lines 790 to 880) for the parallel operation of only transformers 22 and 24 will be explained in detail below since one skilled in the art could determine the instructions for the cases where only transformers 20 and 24 are operating in parallel or where only transformers 20 and 22 are operating in parallel.

Lines 780, 910, and 1040 contain the instructions 344 which determines whether only two transformers are operating in parallel. As stated above, REG(22)'s 1, 2, 3, and 4 bits contain the information of whether the transformers are operating in parallel. Thus line 780 checks whether the third bit is set indicating that only transformer 22 and 24 are operating in parallel, and if not causes the program to skip to line 910 to determine if other transformers are operating in parallel, otherwise the program proceeds to line 790.

As stated above, only lines 790 to 880 will be explained in detail, where lines 790 to 880 determine the error voltage and normalized circulating MVAR level for the transformers when only transformers 22 and 24 are operating in parallel.

Line 790, step 346, contains the instruction which calculates the average low side voltage level for the transformers operating in parallel. The average low side voltage level for two transformers 22 and 24 operating in parallel is equal to the average of the low side bus voltage of these two transformers, more particularly, $$VBAVE=(VBUS2+VBUS3)/2.$$

where the low side bus voltage for each transformer represented by the variables VBUS2, and VBUS3, respectively.

Lines 800 to 850, step 349, contain the instructions which determine the error voltage for each transformer, the total MVAR flow of the transformers operating in parallel, and the average MVAR flow per transformer operating in parallel. For only two transformers 22 and 24 operating in parallel, the error voltage, VERR2, and VERR3 are equal the average low side bus voltage for those two transformers less the nominal low side bus voltage schedule, VNOM, less the bias voltage commanded by the SCADA, SCADAB, less the time clock bias voltage, TCBIAS, more particularly, $$VERR2=VBAVE-VNOM-SCADAB-TCBIAS, \text{ and}$$

$$VERR3=VBAVE-VNOM-SCADAB-TCBIAS.$$

For transformer 20 which is not operating in parallel, the error voltage, VERR1, is equal the low side bus voltage for that transformer less the nominal low side voltage schedule, VNOM, level less the bias voltage commanded by SCADA, SCADAB, less the time clock bias voltage, TCBIAS, more particularly, $$VERR1=VBUS1-VNOM-SCADAB-TCBIAS.$$

The total MVAR flow for the two transformers operating in parallel is then calculated as the normalized sum of the MVAR flow at the low side of each of these transformers (line 840). The variable TMVAR is set equal to the sum of the low side MVAR flow for each of the two transformer operating in parallel multiplied by a normalizing factor, K52 or K53 for MVART2 and MVART3, respectively, more particularly, $$TMVAR=MVART2 * K52+MVART3 * K53.$$

The normalizing constants K52, and K53 are the normalized impedances of the transformers, where the impedance ratios are normalized so the lowest impedance value is set to 1.

Last, these group of lines calculate the average normalized MVAR flow per transformer operating in parallel (line 850). The variable AMVAR is set equal to the variable TMVAR divided by 2, the number of transformers operating in parallel, more particularly, $$AMVAR=TMVAR/2.$$

where the variable TMVAR represents the total normalized MVAR flow all the transformers operating in parallel.

Lines 860 to 880, step 350, contain the instructions which calculate the normalized circulating MVAR flow in each transformer where only transformers operating in parallel have circulating MVAR flow. The normalized circulating MVAR flow for each transformer operating in parallel is equal to the normalized MVAR flow for each transformer operating in parallel less the average normalized MVAR flow for all the transformers operating in parallel, more particularly, $$T2CVAR=MVART2 * K52-AMVAR, \text{ and}$$

T3CVAR=MVART3 * K53−AMVAR.

The variables T1CVAR, T2CVAR, and T3CVAR are set equal to normalized circulating MVAR flow for transformer 20, 22, and 24, respectively, where T1CVAR is set equal to zero since transformer 20 is not operating parallel and thus has no circulating MVAR flow.

Line 890 contains the instruction which causes the program to branch to line 1280 which is the start of the area of the program that determines whether the tap position for each transformer should be changed.

Line 1170, step 352, contains the instruction 352 which determines whether none of the transformers are operating in parallel. REG(22)'s 8th bit contains the information of whether any of the transformers are operating in parallel. If bit 8 is set, then none of the transformers are operating parallel. If bit is not set, the program skips to line 1280, otherwise the program proceeds to line 1180.

Line 1180, step 354, contains the instruction which calculates the average low side bus voltage level for the transformers operating in parallel. However, since there are no transformers operating in parallel, the variable VBAVE is set equal to zero.

Lines 1190 to 1210, step 356, contain the instructions which determine the error voltage for each transformer, the total MVAR flow of the transformers operating in parallel, and the average MVAR flow per transformer operating in parallel. Since transformer 20, 22 and 24 are not operating in parallel, the error voltage, VERR1, VERR2, and VERR3, are set equal the low side bus voltage level for each transformer less the nominal low side voltage schedule, VNOM, level less the bias voltage commanded by SCADA, SCADAB, less the time clock bias voltage, TCBIAS, more particularly,

VERR1=VBUS1−VNOM−SCADAB−TCBIAS,

VERR2=VBUS2−VNOM−SCADAB−TCBIAS, and

VERR3=VBUS3−VNOM−SCADAB−TCBIAS.

The total MVAR flow for transformers operating in parallel is then calculated as the normalized sum of the MVAR flow level at the low side. However, since none of the transformers are operating in parallel, the variable TMVAR is set equal to zero.

Last, these group of lines calculate the average normalized MVAR flow per transformer operating in parallel, but since no transformers are operating in parallel, the variable AMVAR is also set equal to zero.

Lines 1240 to 1260, step 358, contain the instructions which calculate the normalized circulating MVAR flow in each transformer where only transformers operating in parallel have circulating MVAR flow. The variables T1CVAR, T2CVAR, and T3CVAR are set equal zero for transformer 20, 22, and 24, respectively, since transformer 20, 22, and 24 are not operating parallel and thus they each have no normalized circulating MVAR flow.

Line 890 contains the instruction which causes the program to branch to line 1280 which is the start of the area of the program that determines whether the tap position for each transformer should be changed.

Lines 1280 to 1330, step 360, contain the instructions which determine the total error voltage for each transformer in service. If the transformer is not in service, the total error voltage for that transformer will be set to zero.

REG(22)'s 5th, 6th, and 7th bits contain the information of whether transformer 20, 22, and 24 are in service, respectively. Lines 1280 to 1300 look at these bits and set the variables T1NIS, T2NIS, and T3NIS to zero if the transformer 20, 22, or 24 is not in service, respectively. For example, if bit 5 is set, then transformer 20 is in service, and T1NIS will be set 1, if bit 5 is not set, transformer 20 is not in service and the variable T1NIS will be set to zero.

The total error voltage is first calculated for transformer 20. The total error voltage for transformer 20 is equal to the variable VERR1 as calculated above less the normalized circulating MVAR flow for transformer 20, T1CVAR, multiplied by a tap correction feedback constant, K4 plus the line drop of the substation, XDROP, multiplied by the total MVAR flow of the substation, TVAR plus 0 (where 0 is the skew for the first transformer in this embodiment). The value produced is then multiplied by the value of T1NIS (either 1 or 0) and stored in the variable T1ERR, more particularly,

T1ERR=( VERR1−K4*T1CVAR+XDROP*TVAR+0) T1NIS.

T1ERR represents a measure of the actual error voltage for transformer 20, where T1ERR includes VERR1 (which is equal to the difference between the averaged actual low side voltage and the desired or scheduled value) a feedback error voltage due to the normalized circulating MVAR flow of transformer 20 (this is zero if transformer 20 is not operating in parallel) and a line drop compensating error voltage due to the total MVAR load of the substation.

As noted above, T1CVAR is the normalized circulating MVAR flow of transformer 20. A feedback error voltage is calculated as a function of the normalized circulating MVAR flow so that when the transformer is two or more tap positions apart from the other(s), the normalized circulating MVAR flows that result multiplied by the constant K4 will yield feedback error voltages that will cause at least one transformer to be out of the allowable error voltage bandwidth and change to a tap position more nearly equal to the other(s).

Thus, the variable K4 should be chosen so that the normalized circulating MVAR flows that result when any transformer is two or more tap positions apart from the other(s) times this constant K4 will yield a value that is greater than two-thirds of allowable error voltage bandwidth when three transformers are operating in parallel or one-half the bandwidth for two transformers in parallel. This will force the tap position of at least one transformer to change to a position more nearly equal to the other(s). The use of normalized circulating MVAR flows renders K4 independent of the number of paralleled transformers.

In the preferred embodiment, for K4 to be determined, the normalized circulating MVAR flow that occurs when a pair of transformers are two tap positions apart and the allowable error voltage bandwidth must be determined.

In the preferred embodiment, the allowable error voltage bandwidth for a transformer is determined as a function of the change in the output voltage of the transformer caused by the tap position moving up or down one step. For example, if the step size of the transformer is 15/16% and the rated output is 69,000 Volts, the change in output voltage by a step in the tap position would be about 647 volts. Thus a bandwidth greater than 50% of the change in output voltage due to one step would be the minimal bandwidth, for example, a bandwidth greater than 75% of the change in output voltage that occurs for a single step could be set as the allowable error bandwidth, more particularly, bandwidth≧(15/16) % * 69,000 volts * 0.75=485 volts.

Thus the transformer 20 would not be considered out of bandwidth if the total error voltage was in the range of −485 Volts (V) to +485 V.

Next in the preferred embodiment, the normalized circulating MVAR flow level that would be produced by a pair of transformers two tap positions apart must be determined. The MVAR flow due to a pair of transformers be a single tap position apart in a parallel operation of transformers is equal to the step size of the transformer multiplied by its output voltampere rating divided by the impedance percentage of the loop, where the impedance level of the loop is equal to the number of transformer operating in parallel multiplied by the impedance of single transformer divided by the number of transformers operating in parallel less one, more particularly, $$SSMVAR=2 * STEPS * RMVA/ZLOOP, \text{ and}$$

$$ZLOOP=NP * ZTRANS/(NP-1)$$

where SSMVAR is the MVAR flow resulting from a pair of transformers being one tap position apart which are operating in parallel, STEPS is the step size of the transformer, RMVA is the mega voltampere rating of the transformer, ZLOOP, is the no load impedance of the parallel transformers, NP is the number of transformers operating in parallel, and ZTRANS is the rated no load impedance of the transformer.

For example, if there are three transformers operating in parallel (NP), each rated at 150 MVA (RMVA), 15/16% step size (STEPS) and 14.23% impedance (ZTRANS), then the impedance of the loop (ZLOOP) would be:

$$(3) * (14.23\%)/(2)=21.35\%.$$

Then the MVAR flow level due to a tap position in one pair of transformers being one part (SSMVAR) would be:

$$2 * (15/16\%) * (150 \text{ MVA})/(21.35\%)=13.18 \text{ MVAR}$$

and for two tap positions apart, the MVAR flow would be 2 * 13.18 MVAR or 26.36 MVAR.

The constant, K4, is set equal to allowable error voltage bandwidth divided by average of the reactive power flow due a tap position one step apart and a tap position two steps apart, more particularly, $$K4=2 * \text{bandwidth}/(SSMVAR+SSMVAR*2)= \text{bandwidth}/(SSMVAR/2+SSMVAR).$$

In the above examples, the average of tap change positions would be ( (13.18/2)+(26.36) which is equal to 19.77 MVARs. The variable K4 would then be set equal to (bandwidth (485−(−485)) ) 970 V/19.77 MVAR or 49.1 V/MVAR.

By choosing K4 equal to 49.1 V/MVAR, when any pair of transformers are only one position apart, K4 * the normalized circulating MVAR flow would not produce a feedback voltage out of the allowable error voltage bandwidth, however, when a pair of transformers are two tap positions apart, K4 * the normalized circulating MVAR flow would produce a feedback voltage greater than the allowable error voltage bandwidth.

The total error voltage for the transformer also includes a feedback error voltage for line drop compensation. The variable XDROP can be for a positive value to regulate the voltage at some location remote from the substation bus or can be set for a negative value to prevent two electrically close substations from interfering with each other. The variable XDROP is multiplied by the total MVAR load of the substation which was as variable TVAR. At the present time, only "QX" compensation is provided; if more accurate compensation is desired in the future, a "PR" component can be added.

Last as stated above, the resultant total error voltage for transformer 20 is multiplied by the variable T1NIS and stored in the variable T1ERR. The variable T1NIS, as described above, is set equal to 1 when transformer 20 is in service and set equal to 0 when transformer 20 is not in service. Thus, T1ERR will be set to zero when transformer 20 is not in service and no tap change will be initiated.

The same exact calculation is used for determining the total error voltage, T2ERR and T3ERR for transformers 22 and 24, respectively, except the variable SKEW is subtracted from the variable T2ERR, and added to the variable T3ERR where the variable SKEW is the skew amount used in this embodiment and is set by the end user), more particularly, $$T2ERR=(VERR2-K4*T2CVAR+XDROP*TVAR-SKEW * T2NIS, \text{ and}$$

$$T3ERR=(VERR3-K4*T3CVAR+XDROP*TVAR+SKEW * T3NIS.$$

The skew amount, in this embodiment the variable SKEW, which is subtracted from the error voltage for transformer 22 and added to the error voltage for transformer 24 is used to prevent multiple transformers from changing their tap positions when it is not necessary. Due to the accuracy of the system, without addition of the variable SKEW, all the transformers move out of band together. By adding a different skew amount to the total error voltage calculated for a each transformer, multiple transformers will only tend to move out of band simultaneously when a large increase or decrease in voltage occurs.

Lines 1340 to 1360, step 362, contain the instructions to convert the variables T1ERR, T2ERR, and T3ERR to integer variables.

Lines 1380 to 1390, step 364, contain the instructions to convert the registers sent from the PLP 200 to the ABM 230 which represent the lower band, REG(24), and upper band, REG(25) of the total bandwidth to the variables LBAND and HBAND respectively. As described above, the allowable error voltage bandwidth is chosen based on the step size of the transformers and their rated output voltage. In the example above the bandwidth was set to 1.50 times the voltage step of the transformers, namely 970 volts. So, for this example, HBAND would be set to 485 volts, and LBAND would be set to −485 volts, so that if the total error voltage for a transformer is less than LBAND or −485 volts, the tap position for that transformer will be raised, and if the total error voltage (T1ERR for transformer 20) was above 485, the tap position for that transformer will be lowered by one step.

Line 1400, step 366, contains the instruction which sets the value of the tap change register, TAPREG, to zero. This is necessary since the code that follows only sets bits into the register; it does not clear them.

Lines 1410 to 1460, step 368, contain the instructions which set the bits in the variable TAPREG to indicate whether the tap position of transformer should be raised or lowered. The total error voltage for each transformer is compared to the lower bandwidth (bandlimit) and upper bandwidth and an appropriate bit is set in the variable TAPREG if the total voltage error is less the lower bandwidth or greater than the upper bandwidth. For example, if T1ERR is less than LBAND, the first bit of the variable TAPREG is set, or if T1ERR is greater then HBAND, the second bit of the variable TAPREG is set. The 3rd bit of TAPREG is set if T2ERR is less than LBAND, the 4th bit of TAPREG is set if T2ERR is greater than HBAND, the 5th bit of TAPREG is set if T3ERR is less than LBAND, and the 6th bit of TAPREG is set if T3ERR is greater than HBAND.

Lines 1470 to 1500, step 370, are the instructions 370 which convert the variables TAPREG, T1CVAR, T2CVAR, and T3CVAR to registers which will transferred to the PLP 200 over the data bus 225 from the ABM 230.

Lines 1530 to 1580 are the instructions 372 which set the BASIC flag to halt the operation of the BASIC program once it returns to the beginning of the program, and sets the flags for the PLP 200 to inform it that the registers from the ABM 230 are ready to be read.

Lines 1590 to 2280 contain the instructions which generate either normal printout or enhanced printouts on the PRINTER 240 by sending data over the data bus 235 and then cause the program to branch to line 80 where it will remain until the BASIC flag is set again by the PLP 200. Bit position 9 of REG(22) indicates whether the normal or enhanced print mode will be executed. Both print modes send data to the PRINTER 240 over the data bus 235. The PRINTER 240 sends status information to the ABM 230 over the data bus 235.

After the PLP 200 receives the data representing the contents of variable TAPREG and if no other alarms or blocking conditions are detected as described in the description of the ladder program executed in the PLP 200, the PLP 200 will use the contents of the variable TAPREG to direct requests to raise or lower the tap positions of the transformers by sending data over the data bus 245 to the digital output 250. The digital output in this embodiment has six output lines representing signals to the transformer 20 to lower its tap position 140, raise its tap position 136, to the transformer 22 to lower its tap position 142, raise its tap position 138, and to the transformer 24 to lower its tap position 150, raise its tap position 148, respectively.

The raise and lower tap positions signals are sent to solid state relays (SSR) 137, 139, and 149 which use the digital signals to trigger either a rely to raise the tap position of a transformer, or to lower the tap position of a transformer. The SSRs are used to produce the type and size of electrical signal necessary to cause the tap changer to raise or lower the tap position of the transformer since the digital output 250 in this embodiment only generates a 24 VDC (volts direct current) signal and transformers usually require a large AC (alternating current) signal.

While the invention has been described in terms of an exemplary embodiment, it is contemplated that it may be practiced with modifications within the spirit and scope of the appended claims.

The following pages are a copy of the BASIC language code described above.

```
COPYRIGHT  1991 PA. POWER & LIGHT CO.
10 REM TCUL CONTROL PROGRAM WRITTEN BY DAVID L.BASSETT P.E.
20 REM SUBSTATION ENGINEERING, PA. POWER & LIGHT CO.
30 REM TCUL1-3C.ASC,VERSION 1.00,REVISED 09/03/91
40 REM
50 REM
60 PORT1
70 STRING 100,10
80 REG(31)=0
90 REM REG(31)IS USED TO CONTROL FLOW OF THE BASIC PROGRAM
100 IF REG(31)=1234 THEN 110 ELSE 90
110 IF REG(11)>32768 THEN SCADA1=REG(11)-65536 ELSE SCADA1=REG(11)
120 IF REG(12)>32768 THEN SCADA2=REG(12)-65536 ELSE SCADA2=REG(12)
130 IF REG(13)>32768 THEN SCADA3=REG(13)-65536 ELSE SCADA3=REG(13)
140 IF REG(14)>32768 THEN SCADA4=REG(14)-65536 ELSE SCADA4=REG(14)
150 IF REG(17)>32768 THEN TCLCK1=REG(17)-65536 ELSE TCLCK1=REG(17)
160 IF REG(18)>32768 THEN TCLCK2=REG(18)-65536 ELSE TCLCK2=REG(18)
170 IF REG(19)>32768 THEN TCLCK3=REG(19)-65536 ELSE TCLCK3=REG(19)
180 IF REG(20)>32768 THEN TCLCK4=REG(20)-65536 ELSE TCLCK4=REG(20)
190 K11=REG(34)/10
200 K12=REG(35)/10
210 K13=REG(36)/10
220 K31=REG(53)/1000
230 K32=REG(54)/1000
240 K33=REG(37)/1000
250 K4=REG(50)/10
260 K51=REG(33)/100
270 K52=REG(9)/100
280 K53=REG(30)/100
290 VBUS1=(REG(0)-2048)*K11
300 VBUS2=(REG(1)-2048)*K12
310 VBUS3=(REG(5)-2048)*K13
320 IF(REG(51).AND.32)=32 THEN 360
330 IF(REG(22).AND.8)=8 THEN VBUS1=(VBUS2+VBUS3)/2
340 IF(REG(22).AND.2)=2 THEN VBUS1=VBUS3
350 IF(REG(22).AND.1)=1 THEN VBUS1=VBUS2
360 IF(REG(51).AND.64)=64 THEN 400
370 IF(REG(22).AND.8)=8 THEN VBUS2=(VBUS1+VBUS3)/2
380 IF(REG(22).AND.4)=4 THEN VBUS2=VBUS3
390 IF(REG(22).AND.1)=1 THEN VBUS2=VBUS1
400 IF(REG(51).AND.128)=128 THEN 440
410 IF(REG(22).AND.8)=8 THEN VBUS3=(VBUS1+VBUS2)/2
420 IF(REG(22).AND.4)=4 THEN VBUS3=VBUS2
430 IF(REG(22).AND.2)=2 THEN VBUS3=VBUS1
440 VNOM=REG(23)*10
450 SKEW=REG(28)
460 IF REG(29)>32768 THEN XDROP=(REG(29)-65536)/10 ELSE XDROP=REG(29)/10
470 SREG=REG(10)
480 IF SREG=0 THEN SCADAB=0
490 IF SREG=1 THEN SCADAB=SCADA1
```

```
500 IF SREG=2 THEN SCADAB=SCADA2
510 IF SREG=3 THEN SCADAB=SCADA3
520 IF SREG=4 THEN SCADAB=SCADA4
530 TCREG=REG(16)
540 TCBIAS=0
550 IF(TCREG.AND.1)=1 THEN TCBIAS=TCBIAS+TCLCK1
560 IF(TCREG.AND.4)=4 THEN TCBIAS=TCBIAS+TCLCK2
570 IF(TCREG.AND.16)=16 THEN TCBIAS=TCBIAS+TCLCK3
580 IF(TCREG.AND.64)=64 THEN TCBIAS=TCBIAS+TCLCK4
590 MVART1=(REG(2)-2048)*K31
600 MVART2=(REG(3)-2048)*K32
610 MVART3=(REG(4)-2048)*K33
620 TVAR=MVART1+MVART2+MVART3
630 SND(1)=0 : SND(2)=0 : SND(3)=0 : SND(4)=0
640 REM ALL THREE TRANSFORMERS IN PARALLEL
650 IF(REG(22).AND.8)=8 THEN 660 ELSE 780
660 VBAVE=(VBUS1+VBUS2+VBUS3)/3
670 VERR1=VBAVE-(VNOM+SCADAB+TCBIAS)
680 VERR2=VBAVE-(VNOM+SCADAB+TCBIAS)
690 VERR3=VBAVE-(VNOM+SCADAB+TCBIAS)
700 XFMR=3
710 TMVAR=(MVART1*K51)+(MVART2*K52)+(MVART3*K53)
720 AMVAR=TMVAR/XFMR
730 T1CVAR=(MVART1*K51)-AMVAR
740 T2CVAR=(MVART2*K52)-AMVAR
750 T3CVAR=(MVART3*K53)-AMVAR
760 GOTO 1280
770 REM T#2 AND T#3 IN PARALLEL
780 IF(REG(22).AND.4)=4 THEN 790 ELSE 910
790 VBAVE=((VBUS2+VBUS3)/2)
800 VERR1=VBUS1-(VNOM+SCADAB+TCBIAS)
810 VERR2=VBAVE-(VNOM+SCADAB+TCBIAS)
820 VERR3=VBAVE-(VNOM+SCADAB+TCBIAS)
830 XFMR=2
840 TMVAR=(MVART2*K52)+(MVART3*K53)
850 AMVAR=TMVAR/XFMR
860 T1CVAR=0
870 T2CVAR=(MVART2*K52)-AMVAR
880 T3CVAR=(MVART3*K53)-AMVAR
890 GOTO 1280
900 REM T#1 AND T#3 IN PARALLEL
910 IF(REG(22).AND.2)=2 THEN 920 ELSE 1040
920 VBAVE=(VBUS1+VBUS3)/2
930 VERR1=VBAVE-(VNOM+SCADAB+TCBIAS)
940 VERR2=VBUS2-(VNOM+SCADAB+TCBIAS)
950 VERR3=VBAVE-(VNOM+SCADAB+TCBIAS)
960 XFMR=2
970 TMVAR=(MVART1*K51)+(MVART3*K53)
980 AMVAR=TMVAR/XFMR
990 T1CVAR=(MVART1*K51)-AMVAR
```

```
1000 T2CVAR=0
1010 T3CVAR=(MVART3*K53)-AMVAR
1020 GOTO 1280
1030 REM T#1 AND T#2 IN PARALLEL
1040 IF(REG(22).AND.1)=1 THEN 1050 ELSE 1170
1050 VBAVE=(VBUS1+VBUS2)/2
1060 VERR1=VBAVE-(VNOM+SCADAB+TCBIAS)
1070 VERR2=VBAVE-(VNOM+SCADAB+TCBIAS)
1080 VERR3=VBUS3-(VNOM+SCADAB+TCBIAS)
1090 XFMR=2
1100 TMVAR=(MVART1*K51)+(MVART2*K52)
1110 AMVAR=TMVAR/XFMR
1120 T1CVAR=(MVART1*K51)-AMVAR
1130 T2CVAR=(MVART2*K52)-AMVAR
1140 T3CVAR=0
1150 GOTO 1280
1160 REM NO TRANSFORMERS IN PARALLEL,BUT 1 OR MORE IN SERVICE
1170 IF(REG(22).AND.128)=128 THEN 1180 ELSE 1280
1180 VBAVE=0
1190 VERR1=VBUS1-(VNOM+SCADAB+TCBIAS)
1200 VERR2=VBUS2-(VNOM+SCADAB+TCBIAS)
1210 VERR3=VBUS3-(VNOM+SCADAB+TCBIAS)
1220 TMVAR=0
1230 AMVAR=0
1240 T1CVAR=0
1250 T2CVAR=0
1260 T3CVAR=0
1270 REM CALCULATE ERROR SIGNAL
1280 IF(REG(22).AND.16)=16 THEN T1NIS=1 ELSE T1NIS=0
1290 IF(REG(22).AND.32)=32 THEN T2NIS=1 ELSE T2NIS=0
1300 IF(REG(22).AND.64)=64 THEN T3NIS=1 ELSE T3NIS=0
1310 T1ERR=(VERR1-K4*T1CVAR+XDROP*TVAR+0)*T1NIS
1320 T2ERR=(VERR2-K4*T2CVAR+XDROP*TVAR-SKEW)*T2NIS
1330 T3ERR=(VERR3-K4*T3CVAR+XDROP*TVAR+SKEW)*T3NIS
1340 T1ERR=INT(T1ERR)
1350 T2ERR=INT(T2ERR)
1360 T3ERR=INT(T3ERR)
1370 REM*******PRINT T1ERR,T2ERR,T3ERR
1380 LBAND=REG(24)-65536
1390 HBAND=REG(25)
1400 TAPREG=0
1410 IF T1ERR<LBAND THEN TAPREG=1
1420 IF T1ERR>HBAND THEN TAPREG=2
1430 IF T2ERR<LBAND THEN TAPREG=TAPREG+4
1440 IF T2ERR>HBAND THEN TAPREG=TAPREG+8
1450 IF T3ERR<LBAND THEN TAPREG=TAPREG+16
1460 IF T3ERR>HBAND THEN TAPREG=TAPREG+32
1470 REG(40)=TAPREG
1480 REG(41)=INT(T1CVAR)+1000
1490 REG(42)=INT(T2CVAR)+1000
```

```
1500 REG(43)=INT(T3CVAR)+1000
1510 REM RESET REG(31)TO ZERO,TO HALT BASIC PROGRAM UNTIL
1520 REM LADDER PROGRAM HAS RECYCLED.
1530 REG(31)=0
1540 SND(1)=1
1550 SND(2)=1
1560 SND(3)=1
1570 REM SET SND(1),TO ALLOW LADDER PROGRAM TO PROCEED.
1580 SND(4)=1
1590 REM NORMAL PRINTING ROUTINE
1600 R22=REG(22).AND.65280 : REM STRIP OFF LOWER 8 BITS
1610 IF(REG(22).AND.256)=256 THEN 1770 ELSE 1620
1620 IF(R22.AND.512)=512 THEN 1630 ELSE 1740
1630 PRINT "------------------"
1640 HOUR=INT(TIME/3600)
1650 MIN=INT((((TIME/3600)-HOUR)*3600)/60)
1660 SEC=TIME-HOUR*3600-MIN*60
1670 PRINT USING "##",DATE(1),DATE(2),DATE(3),HOUR,":",MIN,":",SEC
1680 TAP1=INT((REG(6)-832)/128)
1690 TAP2=INT((REG(7)-832)/128)
1700 TAP3=INT((REG(8)-832)/128)
1710 PRINT "TAP1=   TAP2=   TAP3="
1720 PRINT TAP1,"    ",TAP2,"    ",TAP3
1730 PRINT "Ave. Bus KV= ", : PRINT USING "##.##",(VBAVE/1000)
1740 OLD22=R22
1750 GOTO 80
1760 REM ENHANCED PRINTING ROUTINE
1770 IF R22<>OLD22 THEN 1780 ELSE 2280
1780 IF DATE(0)=1 THEN $(1)="Sunday"
1790 IF DATE(0)=2 THEN $(2)="Monday"
1800 IF DATE(0)=3 THEN $(3)="Tuesday"
1810 IF DATE(0)=4 THEN $(4)="Wednesday"
1820 IF DATE(0)=5 THEN $(5)="Thursday"
1830 IF DATE(0)=6 THEN $(6)="Friday"
1840 IF DATE(0)=7 THEN $(7)="Saturday"
1850 PRINT "------------------"
1860 PRINT "Today is ",$(DATE(0))
1870 HOUR=INT(TIME/3600)
1880 MIN=INT((((TIME/3600)-HOUR)*3600)/60)
1890 SEC=TIME-HOUR*3600-MIN*60
1900 PRINT USING "##",DATE(1),DATE(2),DATE(3),HOUR,":",MIN,":",SEC
1910 PRINT "DEVICE 1    2    3"
1920 TAP1=INT((REG(6)-832)/128)
1930 TAP2=INT((REG(7)-832)/128)
1940 TAP3=INT((REG(8)-832)/128)
1950 PRINT "TAP=  ",TAP1,"   ",TAP2,"   ",TAP3
1960 PRINT USING "###"
1970 PRINT "MVAR= ",INT(MVART1)," ",INT(MVART2)," ",INT(MVART3)
1980 PRINT "CMVAR=",INT(T1CVAR)," ",INT(T2CVAR)," ",INT(T3CVAR)
1990 PRINT "KV= ", : PRINT USING "##.#",(VBUS1/1000),(VBUS2/1000),(VBUS3/1000)
```

```
2000 PRINT "Ave. Bus KV= ", : PRINT USING "##.##",(VBAVE/1000)
2010 PRINT "SCADA Bias KV= ",SCADAB/1000
2020 PRINT "Total MVAR= ",TVAR
2030 PRINT "Average MVAR= ",AMVAR
2040 PRINT "TC Bias KV= ",TCBIAS/1000
2050 IF(R22.AND.1024)=1024 THEN 2060 ELSE 2070
2060 PRINT "TCUL Excessive Oper."
2070 IF(R22.AND.2048)=2048 THEN 2080 ELSE 2090
2080 PRINT "MVAR diff limit high"
2090 IF(R22.AND.4096)=4096 THEN 2100 ELSE 2110
2100 PRINT "ANALOG TROUBLE"
2110 IF(REG(16).AND.256)=256 THEN 2120 ELSE 2130
2120 PRINT "1 to 3 TCUL BLOCKED"
2130 IF(REG(16).AND.512)=512 THEN 2140 ELSE 2150
2140 PRINT "TCUL FAILURE"
2150 IF(REG(16).AND.1024)=1024 THEN 2160 ELSE 2170
2160 PRINT "Bus Voltage H/L"
2170 IF(REG(26).AND.4)=4 THEN 2180 ELSE 2190
2180 PRINT "AUTO RAISE BLOCKED"
2190 IF(REG(26).AND.2)=2 THEN 2200 ELSE 2210
2200 PRINT "AUTO LOWER BLOCKED"
2210 IF(REG(26).AND.1)=1 THEN 2220 ELSE 2230
2220 PRINT "ALL OPER. BLOCKED"
2230 IF(REG(22).AND.8192)=8192 THEN A1=1 ELSE A1=0
2240 IF(REG(22).AND.16384)=16384 THEN A2=2 ELSE A2=0
2250 IF REG(22)>32767 THEN A3=3 ELSE A3=0
2260 PRINT "Check Device", : PRINT USING "##",A1,A2,A3
2270 OLD22=R22
2280 GOTO 80
2290 END
```

What is claimed:

1. In an electrical power distribution system, a method for controlling at least two voltage regulators, each regulator having a tap changer for varying tap positions, comprising the steps of:

operating the voltage regulators in parallel;

determining an output voltage of each regulator;

determining a reactive power of each regulator;

determining, as a function of the output voltage and the reactive power of the regulators, whether each regulator is operating within an allowable error voltage bandwidth; and determining a tap position for each regulator and performing calculations for each regulator using the determined tap position;

varying, based on the calculations, the tap position of each regulator which is operating outside the allowable error voltage bandwidth to change the regulator output voltage in a direction towards the allowable error voltage bandwidth.

2. The method of claim 1 further includes the step of:

delaying the actuation of a change of output voltage for a first predetermined delay and delaying the actuation of subsequent changes of output voltage by a second predetermined shorter delay if any regulator is outside of the allowable error voltage bandwidth after the first delay.

3. The method of claim 1 where said reactive power is a normalized reactive power.

4. The method of claim 1 where said reactive power is a normalized circulating reactive power.

5. In an electrical power distribution system, a method for controlling the output voltage of a at least two voltage regulators, each regulator having a tap changer for varying tap positions comprising the steps of:

operating the voltage regulators in parallel;

determining an output voltage of each regulator;

determining a reactive power of each regulator;

determining a total error voltage for each regulator operating in parallel as a function of the output voltage and the reactive power of the regulators;

determining whether the total error voltage for each regulator is within an allowable error voltage bandwidth; and determining a tap position for each regulator and performing calculations for each regulator using the determined tap position;.

varying, based on the calculations, the tap position of each regulator which has a total error voltage outside the allowable error voltage bandwidth to change the regulator output voltage in a direction towards the allowable error voltage bandwidth.

6. The method of claim 5 in which the step of determining a total error voltage includes:

determining the circulating reactive power for each regulator as a function of the reactive power of the regulators;

determining the average output voltage from the output voltage of each regulator;

determining a skew voltage to simulate random error for each regulator; and determining a total error voltage for each regulator as a function of the average output voltage for the regulators, circulating reactive power and skew for the regulator.

7. In an electrical power distribution system, apparatus for controlling at least two voltage regulators operating in parallel, each regulator having a tap changer for varying a tap position, comprising:

means for determining an output voltage of each regulator;

means for determining a reactive power of each regulator;

means for determining, as a function of the output voltage and the reactive power of the regulators, whether each regulator is operating within an allowable error voltage bandwidth; and means for determining a tap position for each regulator and performing calculations for each regulator using the tap positions;

means for varying, based on the calculations, the tap position of each voltage regulator operating outside the allowable error voltage bandwidth to change the regulator output voltage in a direction towards the allowable error voltage bandwidth.

8. The apparatus in claim 7 further includes:

means for delaying the actuation of a change of output voltage for a first predetermined delay and delaying the actuation of subsequent changes of output voltage by a second predetermined shorter delay if any regulator is outside of the allowable error voltage bandwidth after the first delay.

9. In an electrical power distribution system, apparatus for controlling the output voltage of a plurality of voltage regulators operating in parallel, each regulator having a tap changer for varying a tap position, comprising:

means for determining an output voltage of each regulator;

means for determining a reactive power of each regulator;

means for determining a total error voltage for each regulator operating in parallel as a function of the output voltage and the reactive power of the regulators;

means for determining whether the total error voltage for each regulator is within an allowable error voltage bandwidth; and means for determining a tap position for each regulator and performing calculations for each regulator using the determined tap positions;

means for varying, based on the calculations, the tap position of each voltage regulator which has a total error voltage outside the allowable error voltage bandwidth to change the regulator output voltage in a direction towards the allowable error voltage bandwidth.

10. The apparatus in claim 9 which further includes:

means for determining the circulating reactive power for each regulator as a function of the reactive power of the regulators;

means for determining the average output voltage from the output voltage of each regulator;

means for determining a skew voltage to simulate random error for each regulator; and means for determining a total error voltage for each regulator as a function of the average output voltage for the regulators, circulating reactive power and skew for the regulator.

11. In an electrical power distribution system, a method for controlling at least two voltage regulators, each regulator having a tap changer for varying tap positions, comprising the steps of:

operating the voltage regulators in parallel;

determining a low side bus voltage of each regulator;

determining a low side reactive power of each regulator;

determining a total error voltage for each regulator as a function of the low side bus voltage and the low side reactive power of the regulators; and determining whether the total error voltage for each regulator is operating outside an allowable error bandwidth where the allowable error bandwidth has a lower band and an upper band; and determining a tap position for each regulator and performing calculations for each regulator using the determined tap positions;

varying, based on the calculations, the tap position of each voltage regulator which is operating outside the allowable error voltage bandwidth to change the regulator output voltage in a direction towards the allowable error voltage bandwidth.

12. The method of claim 11 in which the step of determining a total error voltage includes:

determining a normalized low side reactive power for each regulator as a function of the low side reactive power of the regulators; and determining a total error voltage for each regulator as a function of the low side bus voltage and the normalized low side reactive power of the regulators.

13. The method of claim 11 in which the step of determining a total error voltage includes:

determining a normalized circulating low side reactive power for each regulator as a function of the low side reactive power of the regulators; and determining a total error voltage for each regulator as a function of the low side bus voltage and the normalized circulating low side reactive power of the regulators.

14. The method of claim 13 wherein the determination of a total error voltage for each regulator is also a function of a tap correction feedback constant.

15. The method of claim 14 wherein the determination of a total error voltage for each regulator is also a function of a skew for each regulator.

16. The method of claim 13 in which the step of determining a normalized circulating low side reactive power for each regulator includes:

determining a normalized low side reactive power for each regulator as a function of the low side reactive power and a normalizing factor for each regulator;

determining an average normalized low side reactive power as a function of the normalized low side reactive power for the regulators; and determining a normalized circulating low side reactive power for each regulator as a function of the normalized low side reactive power for each regulator and the average normalized low side reactive power.

17. The method of claim 13 in which the step of determining a total error voltage for each regulator includes:

determining an average low side voltage as a function of the low side voltage for the regulators;

determining an error voltage for each regulator as a function of the average low side voltage and a nominal low side voltage schedule; and determining a total error voltage for each regulator as a function of the error voltage and the normalized circulating low side reactive power of each regulator, a tap correction feedback constant, and a skew for each regulator.

18. The apparatus in claim 7 where said reactive power is a normalized reactive power.

19. The apparatus in claim 7 where said reactive power is a normalized circulating reactive power.

20. In an electrical power distribution system, apparatus for controlling at least two voltage regulators operating in parallel, each regulator having a tap changer for varying a tap position, comprising:

means for determining a low side bus voltage of each regulator;

means for determining a low side reactive power of each regulator;

means for determining a total error voltage for each regulator as a function of the low side bus voltage and the low side reactive power of the regulators; and means for determining whether the total error voltage for each regulator is operating outside an allowable error bandwidth where the allowable error bandwidth has a lower band and an upper band; and means for determining a tap position for each regulator and performing calculations for each regulator using the determined tap positions;

means for varying, based on the calculations, the tap position of each voltage regulator which is operating outside the allowable error voltage bandwidth to change the regulator output voltage in a direction towards the allowable error voltage bandwidth.

21. The apparatus in claim 20 which further includes:

means determining a normalized low side reactive power for each regulator as a function of the low side reactive power of the regulators; and means for determining a total error voltage for each regulator as a function of the low side bus voltage and the normalized low side reactive power of the regulators.

22. The apparatus in claim 20 which further includes:

means for determining a normalized circulating low side reactive power for each regulator as a function of the low side reactive power of the regulators; and means for determining a total error voltage for each regulator as a function of the low side bus voltage and the normalized circulating low side reactive power of the regulators.

23. The apparatus in claim 22 wherein the means for determining a total error voltage for each regulator is also a function of a tap correction feedback constant.

24. The apparatus in claim 23 wherein the means for determining a total error voltage for each regulator is also a function of a skew for each regulator.

25. The apparatus in claim 22 in which the means for determining a normalized circulating low side reactive power for each regulator includes:

means for determining a normalized low side reactive power for each regulator as a function of the low side reactive power and a normalizing factor for each regulator;

means for determining an average normalized low side reactive power as a function of the normalized low side reactive power for the regulators; and means for determining a normalized circulating low side reactive power for each regulator as a function of the normalized low side reactive power for each regulator and the average normalized low side reactive power.

26. The apparatus in claim 22 in which the means for determining a total error voltage for each regulator includes:

means for determining an average low side voltage as a function of the low side voltage for the regulators;

means for determining an error voltage for each regulator as a function of the average low side voltage and a nominal low side voltage schedule; and means for determining a total error voltage for each regulator as a function of the error voltage and the normalized circulating low side reactive power of each regulator, a tap correction feedback constant, and a skew for each regulator.

27. In an electrical power distribution system, a method for controlling the output voltage of a plurality of voltage regulators, operating in parallel comprising the steps of:

a) determining an output voltage of each regulator;

b) determining a reactive power of each regulator;

c) determining a total error voltage for each regulator operating in parallel as a function of the output voltage and the reactive power of the regulators which further comprises the steps of:

i) determining the circulating reactive power for each regulator as a function of the reactive power of the regulators;

ii) determining the average output voltage from the output voltage of each regulator;

iii) determining a total error voltage for each regulator as a function of the average output voltage for the regulators and circulating reactive power for the regulators;

d) determining whether the total error voltage for each regulator is within an allowable error voltage bandwidth; and e) actuating each voltage regulator which has a total error voltage outside the allowable error voltage bandwidth to change its output voltage in a direction towards the allowable error voltage bandwidth.

28. In an electrical power distribution system, a method for controlling voltage regulators operating in parallel comprising the steps of:

determining an output voltage of each regulator;

determining a reactive power of each regulator;

determining, as a function of the output voltage and the reactive power of the regulators, whether each regulator is operating within an allowable error voltage bandwidth;

determining a tap position of each regulator;

determining if the relative difference of tap positions of the regulators are within a predetermined allowable limit after changing the output voltage of a regulator;

actuating each voltage regulator which is operating outside the allowable error voltage bandwidth to change its output voltage in a direction towards the allowable error voltage bandwidth; and not changing the output voltage of a regulator when the change in output voltage would move the tap position to a position that is outside of the allowable limit.

29. In an electrical power distribution system, a method for controlling voltage regulators operating in parallel comprising the steps of:

determining an output voltage of each regulator;

determining a reactive power of each regulator;

determining, as a function of the output voltage and the reactive power of the regulators, whether each regulator is operating within an allowable error voltage bandwidth; and determining a tap position of each regulator;

determining if the tap positions of the regulators are within a predetermined allowable range after changing the output voltage of a regulator;

actuating each voltage regulator which is operating outside the allowable error voltage bandwidth to change its output voltage in a direction towards the allowable error voltage bandwidth; and not changing the output voltage of a regulator when the change in output voltage would move the tap position to a position that is outside of the allowable range.

30. In an electrical power distribution system, apparatus for controlling the output voltage of a plurality of voltage regulators operating in parallel, comprising:

means for determining an output voltage of each regulator;

means for determining a reactive power of each regulator;

means for determining a total error voltage for each regulator operating in parallel as a function of the output voltage and the reactive power of the regulators which further comprises:

means for determining the circulating reactive power for each regulator as a function of the reactive power of the regulators;

means for determining the average output voltage from the output voltage of each regulator;

means for determining a total error voltage for each regulator as a function of the average output voltage for the regulators and circulating reactive power for the regulators;

means for determining whether the total error voltage for each regulator is within an allowable error voltage bandwidth; and means for actuating each voltage regulator which has a total error voltage outside the allowable error voltage bandwidth to change its output voltage in a direction towards the allowable error voltage bandwidth.

31. In an electrical power distribution system, apparatus for controlling voltage regulators operating in parallel comprising:

means for determining an output voltage of each regulator;

means for determining a reactive power of each regulator;

means for determining, as a function of the output voltage and the reactive power of the regulators, whether each regulator is operating within an allowable error voltage bandwidth;

means for determining a tap position of each regulator;

means for determining if the relative difference of tap positions of the regulators are within a predetermined allowable limit after changing the output voltage of a regulator;

means for actuating each voltage regulator operating outside the allowable error voltage bandwidth to change its output voltage in a direction towards the allowable error voltage bandwidth; and means for preventing the changing the output voltage of a regulator when the change in output voltage would move the tap position to a position that is outside of the allowable limit.

32. In an electrical power distribution system, apparatus for controlling voltage regulators operating in parallel comprising:

means for determining an output voltage of each regulator;

means for determining a reactive power of each regulator;

means for determining, as a function of the output voltage and the reactive power of the regulators, whether each regulator is operating within an allowable error voltage bandwidth;

means for determining a tap position of each regulator;

means for determining if the tap positions of the regulators are within a predetermined allowable range after changing the output voltage of a regulator;

means for actuating each voltage regulator operating outside the allowable error voltage bandwidth to change its output voltage in a direction towards the allowable error voltage bandwidth; and means for preventing the changing of the output voltage of a regulator when the change in output voltage would move the tap position to a position that is outside of the allowable range.

* * * * *

UNITED STATES PATENT AND TRADEMARK OFFICE
CERTIFICATE OF CORRECTION

PATENT NO.   : 5,498,954
DATED        : March 12, 1996
INVENTOR(S)  : David L. Bassett et al.

It is certified that error appears in the above-indentified patent and that said Letters Patent is hereby corrected as shown below:

Column 9, line 49, after "away" delete --10--.

Column 10, line 6, after "is" delete --10--.

Column 13, line 44, delete "it" and insert --its--.

Column 17, line 42, in the specification, delete the --hyphen-- between converted and from.

Column 18, line 19, before "program" delete --10--.

Column 19, line 36, delete "determing" and insert --determining--.

Column 22, line 18, in equation before "T1NIS" insert --*--.

Column 24, line 17, in specification, after "SKEW" insert --)--.

UNITED STATES PATENT AND TRADEMARK OFFICE
CERTIFICATE OF CORRECTION

PATENT NO. : 5,498,954
DATED : March 12, 1996
INVENTOR(S) : David L. Bassett et al.

It is certified that error appears in the above-indentified patent and that said Letters Patent is hereby corrected as shown below:

Column 24, line 19, in specification, after "SKEW" insert --)--.

Column 24, line 30, in specification, after "for" delete --a--.

Column 25, line 6, in specification, after "will" insert --be--.

Column 37, line 33, claim 5, after "of" delete --a--.

Signed and Sealed this

First Day of October, 1996

Attest:

BRUCE LEHMAN

*Attesting Officer*  *Commissioner of Patents and Trademarks*